(12) United States Patent
Pan et al.

(10) Patent No.: US 11,210,965 B2
(45) Date of Patent: Dec. 28, 2021

(54) DIAGNOSTIC ANALYZER FOR VISUAL-SPATIAL CONTENT

(71) Applicant: Pearson Education, Inc., New York, NY (US)

(72) Inventors: Tianshu Pan, San Antonio, TX (US);
Susan Raiford, Live Oak, TX (US);
Jianjun Zhu, San Antonio, TX (US);
Clifton Joel Wigtil, San Antonio, TX (US)

(73) Assignee: PEARSON EDUCATION, INC., New York, NY (US)

( * ) Notice: Subject to any disclaimer, the term of this patent is extended or adjusted under 35 U.S.C. 154(b) by 839 days.

(21) Appl. No.: 15/982,847

(22) Filed: May 17, 2018

(65) Prior Publication Data
US 2019/0355269 A1 Nov. 21, 2019

(51) Int. Cl.
*G09B 7/02* (2006.01)
*H04L 29/08* (2006.01)
(Continued)

(52) U.S. Cl.
CPC ............. *G09B 7/02* (2013.01); *G06K 9/46* (2013.01); *G06N 20/00* (2019.01);
(Continued)

(58) Field of Classification Search
CPC ... G06K 9/46; H04L 65/4076; H04L 65/4084; H04L 67/306
See application file for complete search history.

(56) References Cited

U.S. PATENT DOCUMENTS 4,730,253 A * 3/1988 Gordon ................. A61B 5/168
273/429
4,889,422 A 12/1989 Pavlidis
(Continued)

FOREIGN PATENT DOCUMENTS

KR 20020011295 A 2/2002
KR 20020069182 A 8/2002
(Continued)

OTHER PUBLICATIONS

Cahan, et al., "The Regression-Based Discrepancy Definition of Learning Disability: A Critical Appraisal", Journal of Learning Disabilities, Apr. 7, 2010, 11 pages.
(Continued)

*Primary Examiner* — Thomas J Hong
*Assistant Examiner* — Sadaruz Zaman
(74) *Attorney, Agent, or Firm* — Quarles & Brady LLP

(57) ABSTRACT

Techniques described herein relate to performing diagnostic analyses including execution and evaluations of visual-spatial diagnostic content resources. A store of visual-spatial diagnostic content resources may be analyzed to determine the presence or absence of predetermined visual features, and mathematical modeling and/or machine-learning techniques may be used to calculate item parameter metrics for each visual-spatial diagnostic content resource. Thereafter, diagnostic sessions may proceed by selecting and presenting sequences of visual-spatial diagnostic content resources within an appropriate range of difficulty metrics, depending on the content recipient and performance on the previously-transmitted visual-spatial diagnostic content resources.

10 Claims, 14 Drawing Sheets

(51) Int. Cl.
  *H04L 29/06* (2006.01)
  *G06K 9/46* (2006.01)
  *G06N 20/00* (2019.01)
(52) U.S. Cl.
  CPC ...... *H04L 65/4076* (2013.01); *H04L 65/4084* (2013.01); *H04L 67/306* (2013.01)

(56) References Cited

U.S. PATENT DOCUMENTS

| | | | |
|---|---|---|---|
| 5,868,683 A | 2/1999 | Protopapas et al. | |
| 5,991,595 A | 11/1999 | Romano et al. | |
| 6,045,515 A * | 4/2000 | Lawton | A61B 3/022 600/558 |
| 6,457,362 B1 * | 10/2002 | Wright | A61B 5/12 600/559 |
| 6,704,741 B1 | 3/2004 | Lively, Jr. et al. | |
| 7,122,004 B1 * | 10/2006 | Cassily | G16H 20/70 600/300 |
| 7,958,457 B1 * | 6/2011 | Brandenberg | G01S 19/48 715/789 |
| 8,412,736 B1 * | 4/2013 | Arnold | G06F 16/2465 707/776 |
| 8,887,046 B2 * | 11/2014 | Shmuylovich | G06F 3/04883 715/705 |
| 9,600,074 B2 * | 3/2017 | Arnold | G06F 3/016 |
| 9,691,293 B2 * | 6/2017 | Arnold | G06F 3/017 |
| 2003/0088159 A1 | 5/2003 | Dietrich | |
| 2004/0161728 A1 | 8/2004 | Benevento et al. | |
| 2006/0087987 A1 * | 4/2006 | Witt | H04N 19/172 370/260 |
| 2009/0304272 A1 * | 12/2009 | Makadia | G06F 16/58 382/165 |
| 2011/0177480 A1 * | 7/2011 | Menon | G09B 7/00 434/238 |
| 2012/0258436 A1 * | 10/2012 | Lee | G09B 19/003 434/362 |
| 2013/0195204 A1 * | 8/2013 | Reznik | H04N 21/44218 375/240.26 |
| 2014/0370479 A1 * | 12/2014 | Gazzaley | A61B 5/168 434/322 |
| 2015/0118661 A1 * | 4/2015 | Haruta | A61B 5/16 434/169 |
| 2015/0206441 A1 * | 7/2015 | Brown | G09B 5/00 434/308 |
| 2015/0331813 A1 * | 11/2015 | Perrin | A63F 13/355 345/522 |
| 2016/0294894 A1 * | 10/2016 | Miller | G06F 16/24578 |
| 2017/0031999 A1 * | 2/2017 | Kapoor | G06F 16/116 |
| 2017/0069216 A1 * | 3/2017 | Vaughan | G16H 50/70 |
| 2017/0103667 A1 | 4/2017 | Chaniotakis et al. | |
| 2017/0300816 A1 * | 10/2017 | Ferrara | G06F 16/22 |
| 2018/0132105 A1 * | 5/2018 | Nealis | H04W 12/08 |
| 2018/0232651 A1 * | 8/2018 | Potter | G06F 11/3438 |
| 2018/0270900 A1 * | 9/2018 | Zhu | H01Q 1/48 |
| 2018/0284982 A1 * | 10/2018 | Veeramani | G06F 3/011 |
| 2018/0293173 A1 * | 10/2018 | Zhu | G06F 12/0811 |
| 2019/0104201 A1 * | 4/2019 | Bati | H04L 61/251 |
| 2019/0166404 A1 * | 5/2019 | Zhao | H04N 21/2393 |
| 2019/0221131 A1 * | 7/2019 | Levinson | G09B 7/08 |
| 2019/0238914 A1 * | 8/2019 | Reibman | H04L 67/306 |

FOREIGN PATENT DOCUMENTS

| | | |
|---|---|---|
| KR | 20120034831 A | 4/2012 |
| WO | WO-82001613 A1 | 5/1982 |

OTHER PUBLICATIONS

Cruickshank, W. L., "Learning Disabilities: A Neurophysiological Dysfunction", Journal of Learning Disabilities, Jan. 1983, pp. 27-29.

Gebhardt; Friedrich, "Survey on ClusterTests for Spatial Area Data", Updated version of GMD Report 7, Apr. 1998, 32 pages.

Maguire, et al., "Design of a Virtual Learning Environment for Students with Special Needs", Human Technology, 2(1), Apr. 2006 pp. 119-153, retrieved from www.humantechnology.jyu.if.

Marino, et al., "Making Informed Assistive Technology Decisions for Students With High Incidence Disabilities", Council for Exceptional Children, TEACHING Exceptional Children, Jul./Aug. 2006, 10 pages.

Sampath, et al., "Web Application Testing with Customized Test Requirements An Experimental Comparison Study", ISSRE, Nov. 10, 2006, 31 pages.

Watkins, Marley Wayne, "Diagnostic utility of the WISC-III developmental index as a predictor of learning disabilities", Journal of Learning Disabilities, May 1, 1996, pp. 1-9.

* cited by examiner

DIAGNOSTIC ANALYZER FOR VISUAL-SPATIAL CONTENT

BACKGROUND

Using content delivery network infrastructures and content receiver devices such as laptop and desktop client computers, tablet devices, televisions, etc., upstream content providers can provide vast and diverse content resources to users live, live-streamed, and on-demand. In some cases, content distribution networks and systems may generate and provide various interactive content resources to content receiver devices using various delivery techniques. Such interactive content resources may include, for example, audio and video media content, gaming software, professional training and educational content resources, clinical assessments administered by educators or medical personnel to students or patients, and the like. In some cases, large data stores of interactive content resources may be available to be transmitted to and executed by client devices. Particular sets or sequences of content resources may be selected and transmitted to client devices for presentation and execution for particular users. Response and performance data, and/or other feedback data associated with the execution of the content resources, may be received by the content provider via one or more feedback channels. Subsequent sets or sequences of content resources may be selected based on the performance data and/or feedback data received in connection with previously-transmitted sets of content resources.

BRIEF SUMMARY

Various techniques are described herein for performing diagnostic analyses via execution and evaluation of visual-spatial diagnostic content resources. In some embodiments, a data store comprising sets of one or more types of visual-spatial diagnostic content resources may be generated and stored for use in diagnostic analyses. Each visual-spatial diagnostic content resources may include visual content elements, which may be stored as computer image-based content and/or data to be interpreted and rendered visually by a recipient device. The visual content of each diagnostic content resource may be analyzed to detect the presence or absence of particular visual features within the visual content. Presence or absence of visual features can be detected via image analysis or other techniques. In some analyses, the visual features detected may include features such as image symmetry with respect to one or more axes, the presence or absence of visual gridlines and/or borders, image rotation factors, the presence or absence of specific shapes or patterns within visual content, threshold ratios of white space within the image, etc. Certain visual features might be detected only during analysis of particular types of visual-spatial diagnostic assessments, while other visual features might be applicable to multiple diagnostic assessments types.

Additional techniques described herein relate to mathematical modeling and/or machine-learning algorithms and related techniques that may be performed to calculate item parameter metrics (e.g., item difficulty, discrimination, etc.) for particular visual-spatial diagnostic content resources, based on the subsets of the visual features detected in the visual-spatial content fields of the resources. In some embodiments, techniques such as linear or non-linear regression models, multivariate base rate analysis, and/or diagnostic performance predictions based on trained machine learning algorithms may be used to compute item parameter metrics for particular visual-spatial diagnostic content resources. Different mathematical models and/or machine-learning techniques may be selected for use in different implementations, including embodiments in which the models and/or algorithms may be selected based on the specific type of visual-spatial diagnostic content resources and/or the particular category or classification of content recipients.

Further techniques described herein may relate to interactive diagnostic analysis sessions performed by diagnostic analyzers for particular recipients. Such diagnostic sessions may comprise real-time generation, evaluation, and/or selection of visual-spatial diagnostic content resources for the particular recipient. A selected set or sequence of diagnostic content resources may be presented to recipients via an interactive client device during the diagnostic sessions. The diagnostic content resources may be a customized sequence of content resources, selected based on diagnostic assessment type, recipient characteristics, recipient device characteristics, and/or the item parameter metrics calculated for individual diagnostic content resources.

Further techniques and areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION

Figure 1:
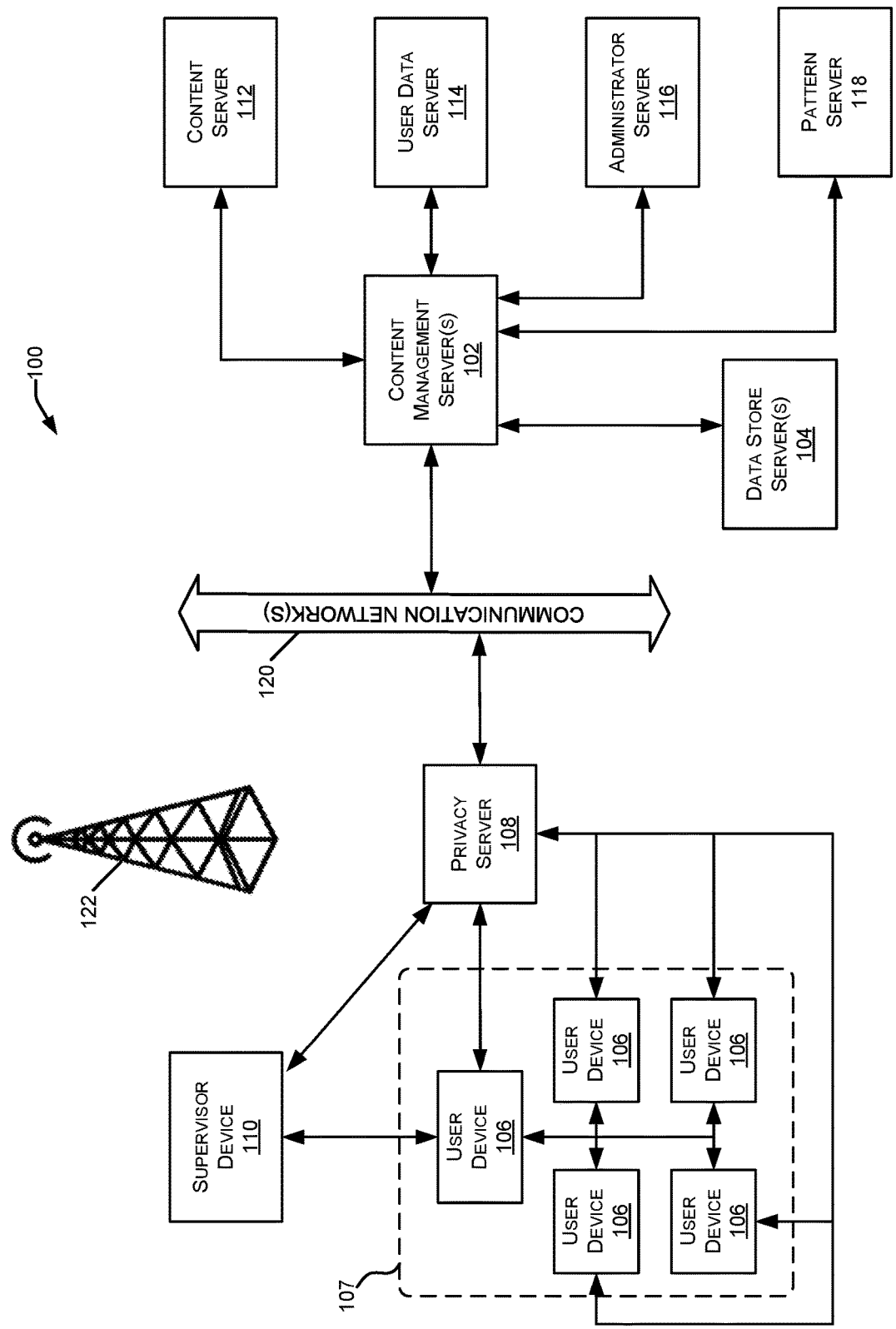
FIG. 1 is a block diagram illustrating an example content distribution network in accordance with one or more embodiments of the disclosure.

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, digital signal processors (DSPs), or the like. In some examples, some or all of the processing units can be implemented using customized circuits, such as application specific integrated circuits (ASICs), or field programmable gate arrays (FPGAs).

Various embodiments of the present disclosure described herein may be performed within content distribution networks implemented to transmit/receive content resources, such as interactive training content, assessments, multimedia content, educational data, and evaluation content, etc. In certain examples described below, a content resource may corresponding to visual-spatial assessment item for use in an diagnostic assessment or evaluation of a recipient (e.g., an examinee or other user). Such content resources may be delivered on-request to client devices operated by users in remote or local locations, or may be delivered live in a present local or live-streamed to remote locations. In some cases, the recipient users receiving the content may provide responses/answers to assessment items, and other feedback relating to the execution of the content resources.

In this context, various techniques (e.g., systems, methods, computer-program products tangibly embodied in a non-transitory machine-readable storage medium, etc.) are described herein for performing diagnostic analyses via execution and evaluation of visual-spatial diagnostic content resources. In some embodiments, a data store of visual-spatial diagnostic content resources, such as visual-spatial assessment items for use in evaluations, clinical diagnostic assessments of perceptive reasoning skills, etc., may be generated and automatically evaluated for subsequent use in such diagnostic assessments. Individual visual-spatial diagnostic content resources (which also may be referred to as visual assessment items) may store visual content elements (e.g., images, graphical rendering data, etc.) to be rendered and presented during a visual-spatial diagnostic assessment. Such diagnostic assessments may include, for example, Wechsler Block Design tests, differential ability skills (DAS) tests, image similarity tests, matrix reasoning tests, and/or any other interactive diagnostic analysis using visual content. Diagnostic analyzer systems and servers, described below in more detail, may analyze the visual content of each diagnostic content resource to detect the presence or absence of particular visual features. Detecting the presence or absence of particular visual features may be performed using image analyses and/or other techniques, and examples of the visual features detected may include features such as image symmetry with respect to one or more axes, the presence or absence of visual gridlines and/or borders, image rotation factors, the presence or absence of specific shapes or patterns within visual content, threshold ratios of white space within the image, etc. Certain visual features might be applicable only during analyses of particular types of visual-spatial diagnostic assessments (e.g., a Wechsler Block Design 2×2 test only), while other visual features might be applicable to multiple diagnostic assessment types.

Additional techniques described herein relate to using mathematical modeling and/or machine-learning algorithms and related techniques to calculate item parameter metrics (e.g., item difficulty, discrimination, etc.) for particular visual-spatial diagnostic content resources, based on the subsets of the visual features detected in the visual content of the resources. Techniques such as linear or non-linear regression models, multivariate base rate analysis, and/or trained machine-learning algorithms may be used to predict diagnostic performance (e.g., user performance on particular visual-spatial test/assessment items, etc.), and thus may be used to compute item parameter metrics (or scores) for particular visual-spatial diagnostic content resources (e.g., visual assessment items). In some embodiments, multiple different mathematical models and/or machine-learning techniques may be implemented, based on factors such as the specific type of visual-spatial diagnostic content resource (e.g., Wechsler Block Design test items, cognitive differential ability skills (DAS) teste items, image similarity test items, or matrix reasoning test items, etc.). Additionally, different mathematical models and/or machine-learning techniques may be selected and implemented for different categories or classifications of content recipients (e.g., examinees receiving and interacting with the visual test/ assessment questions).

Further techniques described herein may relate to interactive diagnostic analysis sessions (or interactive testing/ evaluation sessions) performed by diagnostic analyzers for particular recipients. Such diagnostic sessions may comprise real-time generation, evaluation, and/or selection of visual-spatial diagnostic content resources for the recipient. A selected set or sequence of visual assessment items may be presented to recipients via a client device during the diagnostic sessions. Visual assessments may include a customized sequence of content resources, selected based on diagnostic assessment type (e.g., Wechsler Block Design test items, etc.) and based on the item parameter metrics calculated for the individual diagnostic content resources. Additional factors used to select the set of diagnostic content/ visual assessment items for a particular recipient may include certain recipient characteristics, such as user age, previous assessment results, skills or abilities, or previous diagnoses results, and/or characteristics of the recipient's current client device and/or testing environment.

Additional embodiments described herein relate to analyzing the execution of content resources on client devices, using interactive modules and monitoring processes by client devices, diagnostic analyzer servers, and/or intermediary execution client devices that control a diagnostic session. For example, during diagnostic sessions in which visual assessment items are executed, the client computing device may be configured to communicate with a diagnostic analyzer server to select and retreive diagnostic modules comprising sets of visual-spatial content resources (e.g., perceptive reasoning user assessments of visual-spatial abilities) for execution on the client device (or an intermediary execution devices). Responses to the visual assessment items and/or other feedback data may be received from the client devices. Although the content resources described in certain examples herein may correspond to visual-spatial assessment/evaluation items, such as Wechsler Block Design questions), it should be understood that in other examples, similar or identical techniques may be performed on other interactive content resources such as audio and video media resources, gaming software resources, professional training and educational resources, clinical assessment resources, etc. Any of these interactive content resources may be transmitted and executed in the form of diagnostic software modules designed to perform diagnostic evaluations for clinicians when classifying and diagnosing examinee users (e.g., individual students, patients, trainees, etc.) Response or feedback data corresponding to the execution of content resources via client devices may be received and stored in one or more data structures storing associations between particular content resources and particular examinees. The data structures may be analyzed to determine correlations between particular characteristics, skills, or traits of an examinee, and potential diagnoses that may apply to the examinee.

After determining such correlations, client devices and/or diagnostic analyzer servers may select additional diagnostic content resources to continue a diagnostic visual-spatial perceptive reasoning assessment of the recipient/examinee, where the selections may be provided to client devices during the same or a subsequent diagnostic session. For example, diagnostic sessions of visual assessment items may include executing (e.g., retrieving and presenting to the recipient) successive sets of diagnostic visual-spatial assessment items, on the recipient's client device (and/or a separate interactive content execution device). During the execution of diagnostic modules, the client device and/or diagnostic analyzer server may analyze the recipient's results on previous assessment items, and then subsequent assessment items for execution by the recipient during the same diagnostic session and/or subsequent diagnostic sessions. Such analyses may be based on the recipient's responses and other performance data received via the client device to previous visual assessment items (or diagnostic modules of multiple assessment items), along with data received from additional data sources related to the recipient/examinee. For example, a software module executed on the client device and/or the diagnostic analyzer server may analyze the recipient's results/scores in real-time or near real-time and may select additional visual assessment items and/or diagnostic modules for the recipient. The selection of custom visual assessment items for a particular recipient/ examinee may technical advantages with respect to the efficiency and computing resources used for diagnostic analyses, as well as in the overall accuracy of such diagnostic processes. For example, dynamic and/or customized selections of visual assessment items for a recipient during a diagnostic session, based on the determined item parameter metrics for the items, may permit the client device and/or diagnostic analyzer server to more quickly identify the recipient's visual-spatial aptitudes and skill levels, thus allowing for faster tuning of item parameters and shorter/ quicker diagnostic processes. Additional technical advantages may be gained from the use of mathematical modeling and/or machine-learning techniques to enable more efficient and robust diagnostic analyses, which includes identifying specific clinical diagnoses for recipients by detecting complex combinations of visual features within particular visual assessment items, and by evaluating the recipient's performance for sets of diagnostic content resources in comparison to the feature-based item parameter metrics calculated for those diagnostic content resources.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, clinician/teacher devices and patient/student devices in a clinical diagnosis or learning classification network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, clinician devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources (e.g., visual-spatial assessment items) for distribution to user devices 106 and other devices in the network 100. For example, in content distribution networks 100 used for professional training and educational purposes, or clinical diagnosis of students/patents, the content server 112 may include data stores of training materials, presentations, plans, syllabi, reviews, evaluations, interactive programs and simulations, course models, course outlines, assessments and diagnostic modules, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the contexts of professional training, education, and/or clinical diagnosis of students or patients, the user data server 114 may store and analyze each user's assessments completed or training materials viewed, presentations attended, courses or tests completed, the user's responses or other interactions, assessment or evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.). The user data server 114 may also store user patterns associated with body movements and/or facial expressions made during content delivery that may indicate emotions such as confidence, confusion, frustration, etc.

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

Pattern server 118 may include hardware and software components to initiate various functions related to pattern manipulation as well as interacting with other components within the content distribution network. The pattern server 118 can compare stored patterns to incoming patters and linked values to generate pattern values that are used to dictate certain workflows performed by the content management server 102. The pattern server 118 may also store the incoming patterns and linked values in appropriate data stores. Pattern server 118 comprises a pattern engine and associated functionality.

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
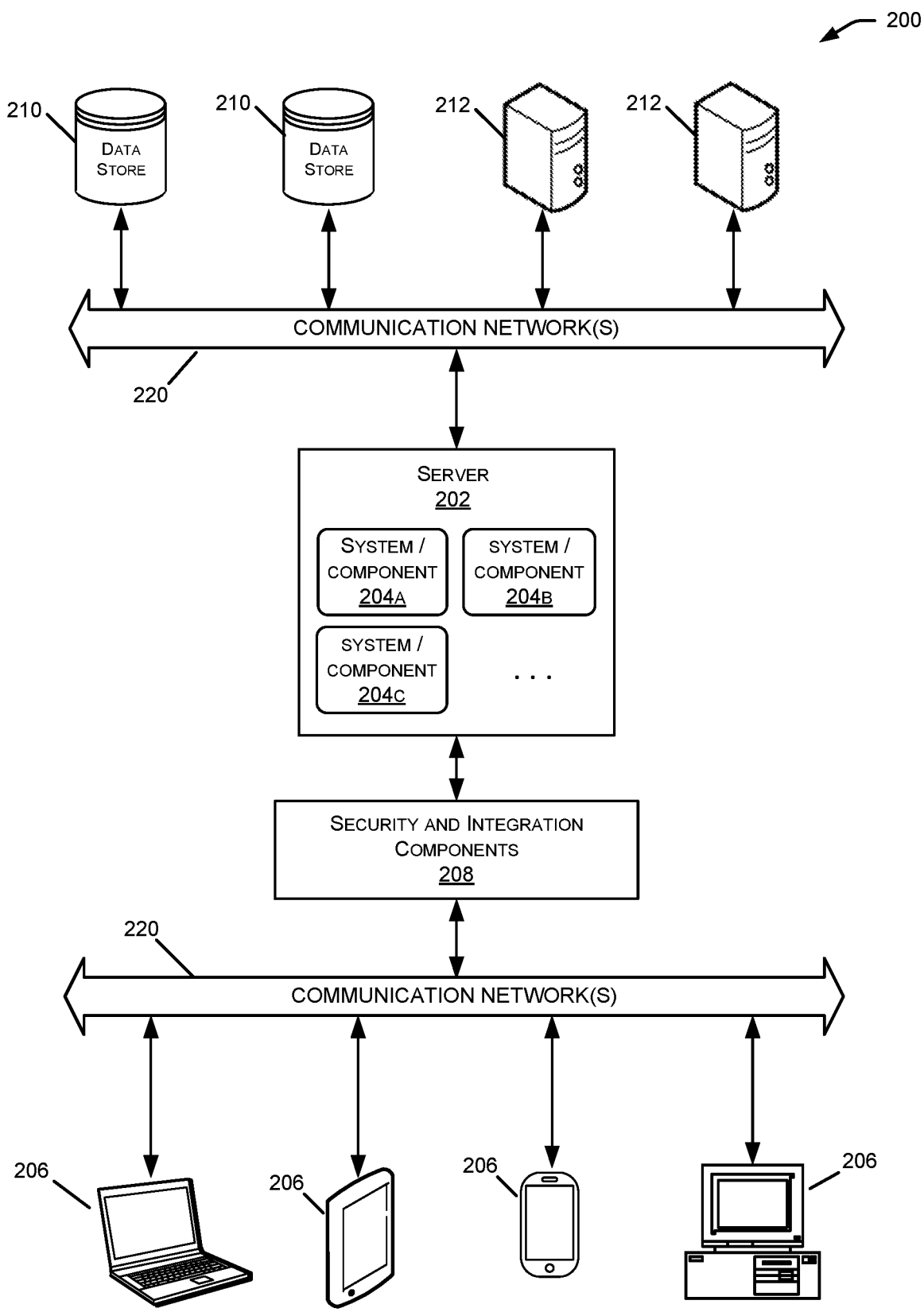
FIG. 2 is a block diagram illustrating a computer server and computing environment within a content distribution network, in accordance with one or more embodiments of the disclosure.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. As an example discussed in more detail below, certain client devices 206 having sufficient authorization credentials may be configured an interactive content execution device, which may be configured to initiate, monitor, and control the execution of interactive content resources via other client receiver devices 206. Server 202 (e.g., a diagnostic analyzer server) may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEFF) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
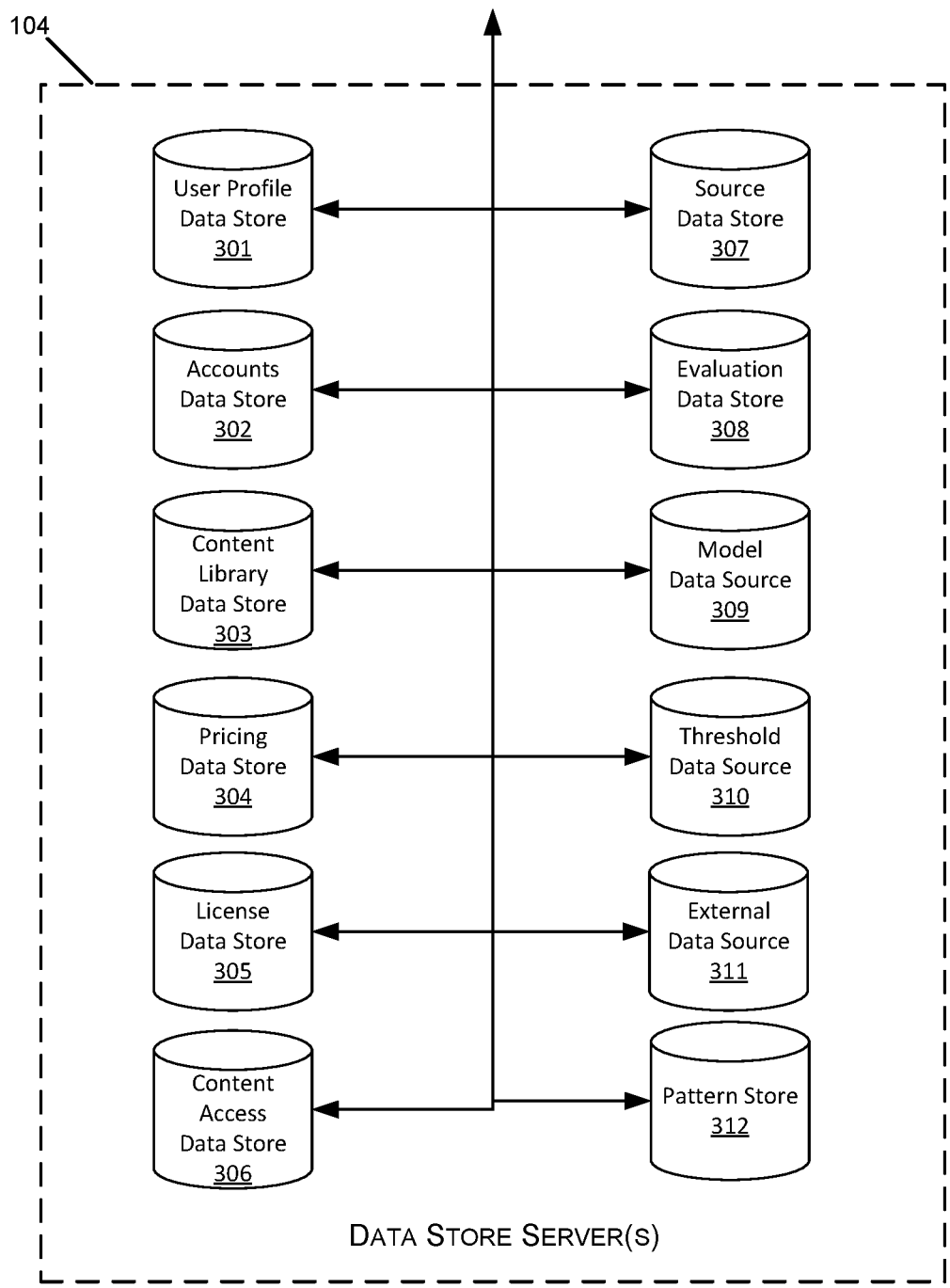
FIG. 3 is a block diagram illustrating an embodiment of one or more data store servers of a content distribution network, in accordance with one or more embodiments of the disclosure.

With reference to FIG. 3, an illustrative set of data stores and/or data store servers is shown, corresponding to the data store servers 104 of the content distribution network 100 discussed above in FIG. 1. One or more individual data stores 301-312 may reside in storage on a single computer server 104 (or a single server farm or cluster) under the control of a single entity, or may reside on separate servers operated by different entities and/or at remote locations.

In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-312, including their functionality and types of data stored therein, are illustrative and non-limiting. Data stores server architecture, design, and the execution of specific data stores 301-312 may depend on the context, size, and functional requirements of a content distribution network 100. For example, in content distribution systems 100 used for clinical diagnosis of examinees such as students and other patients, as well as distribution systems 100 for professional training and educational purposes, separate databases or file-based storage systems may be implemented in data store server(s) 104 to store student/patient assessment data, trainee data and/or student learning data, clinician, trainer and/or professor data, diagnostic module data (e.g., data defining which content resources and versions are in which diagnostic modules), training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several clinicians, patients, students, teachers, administrators, or the like, and in some embodiments, this information can relate to one or several institutional end users such as, for example, one or several hospitals or clinics, schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are examinees (e.g., patients or students) of a diagnostic analysis (e.g., the visual-spatial perceptive reasoning abilities assessments described herein), the user profile database 301 can further include information relating to these examinees' medical, behavioral, academic and/or educational history. This information can identify one or several courses of study or assessments that the examinee has previous initiated, completed, and/or partially completed, as well as grades/evaluations received in those courses of study or assessments. In some embodiments, the examinee's medical, behavioral, academic, and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several examinee/student learning preferences. In some embodiments, for example, the user, also referred to herein as the examinee (e.g., patient or student), or the student-user may have one or several preferred learning styles and/or assessment styles, one or several most effective learning styles, and/or the like. In some embodiments, the examinee's learning/assessment style can be any style describing how the examinee best learns or tests, or prefers to learn or test. In one embodiment, these styles can include, for example, identification of the examinee as an auditory learner, as a visual learner, and/or as a tactile learner. In some embodiments, the data identifying one or several examinee learning styles can include data identifying a learning style based on the examinee's educational history such as, for example, identifying a student as an auditory learner when the student has received significantly higher grades and/or scores on assessments or assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

In yet other embodiments the user profile data store 301 can include a user patterns store containing digitally captured facial expressions of the user. These patterns can be linked to pattern values that represent the sentiment expressed at the time of capture. For instance, a first pattern may be associated to a first value where the first value indicates the user was sad, happy, bored, confident, frustrated, angry, etc. These patterns and values can further be used to evaluate the user, the delivered content, the content provider, the content delivery method, etc. For instance, a value that indicates the examinee is bored could mean that the content in a diagnostic assessment is not being delivered at a high enough level, at too high of a level, is not interesting to the user, etc.

The user profile database 301 can further include information relating to one or several clinicians, teachers and/or instructors who are responsible for organizing, presenting, and/or managing the presentation of information to the student. In some embodiments, user profile database 301 can include information identifying courses and/or subjects that have been taught by a teacher (or assessments/modules given by a clinician), data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the clinician/teacher. In some embodiments, the user profile database 301 can further include information relating to improvement suggestions received by the clinician/teacher, training received by the clinician/teacher, continuing education received by the clinician/teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network or content aggregation network. The aggregation network can comprise a plurality of content aggregations that can be linked together by, for example: creation by common user (e.g., clinician, patient, student); relation to a common assessment, subject, topic, skill, or the like; creation from a common set of source material such as a diagnostic module or the like. In some embodiments, the content aggregation can comprise a grouping of content comprising the presentation portion of an assessment that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets they can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the assessment (or assessment battery), syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources (e.g., assessments) may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students/patients, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like. Evaluation data store 308 also includes evaluations tabulated from pattern detection for content including instructional content and instructors.

A model data store 309, also referred to herein as a model database 309 can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), non-linear regression (e.g., Logistic Regression), Discriminant Function Analysis, Principal Factor Analysis (PFA), linear and/or non-linear multiple regression models, multivariate base rate analysis, or the like. The evidence model can, in some embodiments, be customizable to a user and/or to one or several content items. Specifically, one or several inputs relating to the user and/or to one or several content items can be inserted into the evidence model. These inputs can include, for example, one or more measures of user skill level, one or more measures of content item parameter (e.g., difficulty) and/or skill level, one or more measures of symptom severity/behavioral expression, one or more measures of functional interference, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a examinee receiving a particular classification or diagnosis, a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of an assessment or program such as, for example, a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the assessment/program. Specifically, in some embodiments, these completion status can be selected to all be at less than 60% completion of the assessment/program, and more specifically, in some embodiments, the first completion status can be at 20% completion of the assessment/program, the second completion status can be at 30% completion of the assessment/program, the third completion status can be at 40% completion of the assessment/program, and the fourth completion status can be at 50% completion of the assessment/program. Similarly, any desired number of model functions can be associated with any desired number of completion statuses.

In some embodiments, a model function can be selected from the plurality of model functions based on a user's progress through an assessment/program. In some embodiments, the user's progress can be compared to one or several status trigger thresholds, each of which status trigger thresholds can be associated with one or more of the model functions. If one of the status triggers is triggered by the user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program (or assessment) status parameters. In some embodiments, each of the model functions can use the same program status parameters, and in some embodiments, the model functions can use different assessment/program status parameters. In some embodiments, the model functions use different assessment/program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

A threshold database 310, also referred to herein as a threshold database, can store one or several threshold values. These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

A pattern store 312 is a database containing patterns with linked values. The patterns represent digitized facial expressions of a multitude of people and the linked values are the sentiments corresponding to the facial expression at the time the digital pattern was captured. In some cases sentiment values can be averaged over the multitude of patterns with the same sentiment value and or remain searchable for each pattern and linked value. This is thus a generic pattern database since the patterns and linked values are not associated with a particular user of the content distribution network 100, although it could be comprised of patterns and values of all or a portion of the users of the content distribution network 100.

Figure 4:
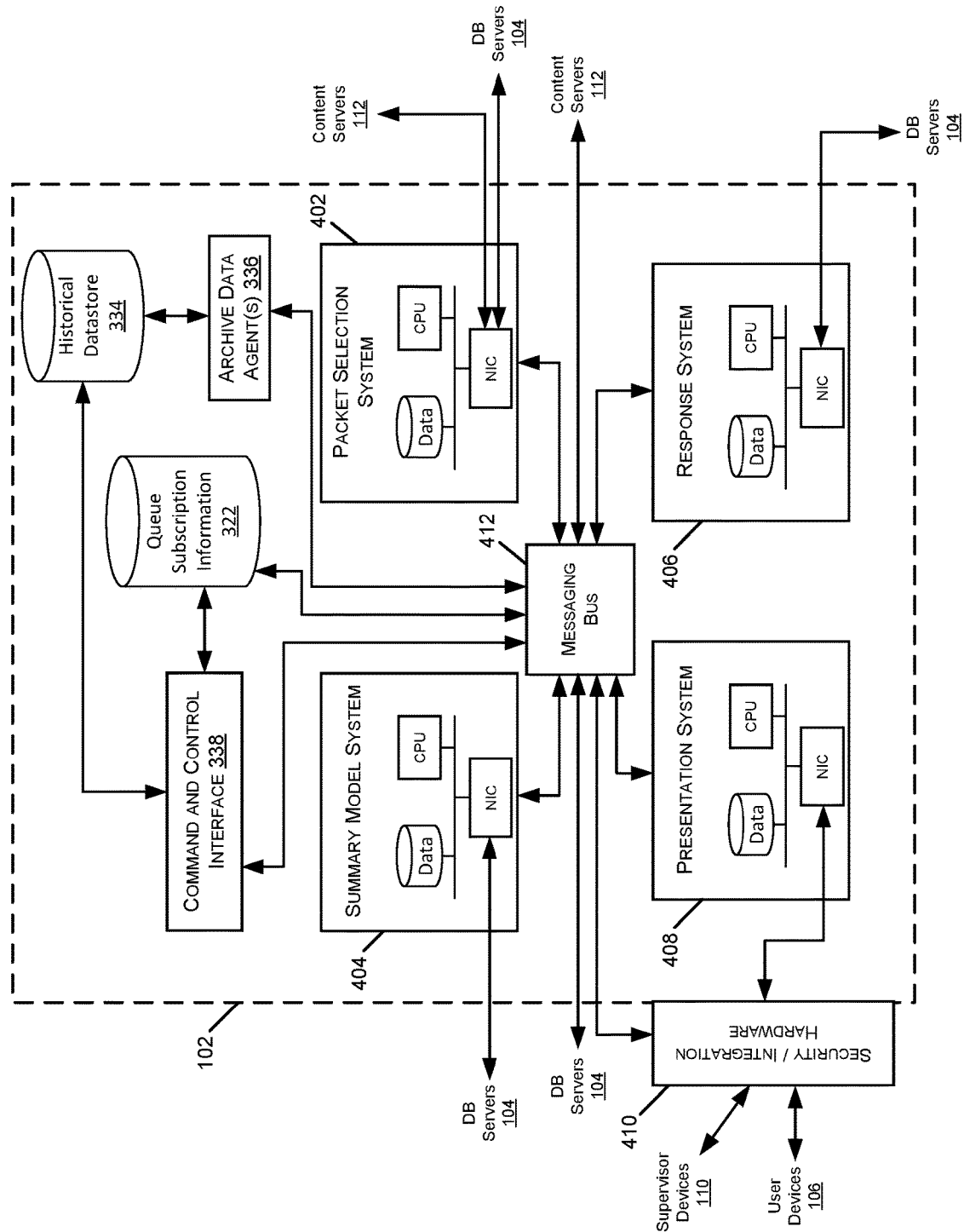
FIG. 4 is a block diagram illustrating an embodiment of one or more content management servers within a content distribution network, in accordance with one or more embodiments of the disclosure.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content resources (e.g., diagnostic modules of visual assessments) provided to users; content consumed by users; responses provided by users (e.g., clinicians/students/patients); user skill levels; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response but define an identifier of that user as a private variable that would not be passed to processing subscribers lacking access to that user and/or authorization to receive that user data. Processing subscribers having access to that user and/or authorization to receive that user data would receive the subscriber identifier along with response reported that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. Specifically, in some embodiments, the messaging bus 412 can receive and output information from at least one of the packet selection system, the presentation system, the response system, and the summary model system. In some embodiments, this information can be output according to a "push" model, and in some embodiments, this information can be output according to a "pull" model.

As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers may subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-48, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content (e.g., particular visual assessment items within clinical assessments and/or diagnostic modules), also referred to herein as data packets, for providing to a user. These data packets can be selected based on, for example, the information retrieved from the database server 104 including, for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a user based on one or several received responses from that user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102.

In some embodiments, the summary model system 404 may monitor the progress of users through various types of content resources and groups, such as media compilations, courses or curriculums in clinical diagnoses, training or educational contexts, interactive gaming environments, and the like. For example, the summary model system 404 may query one or more databases and/or data store servers 104 to retrieve user data such as associated content compilations (e.g., diagnostic modules), content programs (e.g., assessments), content completion status, user goals, results, and the like.

A content management server 102 also may include an response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106—including patterns associated with facial expressions, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, examinee evaluation scores, clinician/teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several response into one or several observables can include determining whether the one or several response are correct responses, also referred to herein as desired responses, or are incorrect responses, also referred to herein as undesired responses. In some embodiments, the translation of the one or several response into one or several observables can include characterizing the degree to which one or several response are desired responses and/or undesired responses. In some embodiments, one or several values can be generated by the response system 406 to reflect user performance in responding to the one or several data packets. In some embodiments, these one or several values can comprise one or several scores for one or several responses and/or data packets. In other embodiments, the response system 406 can be configured to receive one or more patterns from the user device 106 corresponding with digitized facial expressions made by the user of the user device 106 during delivery of the content. The response system 406 can match sentiment values to workflows and initiate the workflows according to values computed from the patterns received from user devices 106.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
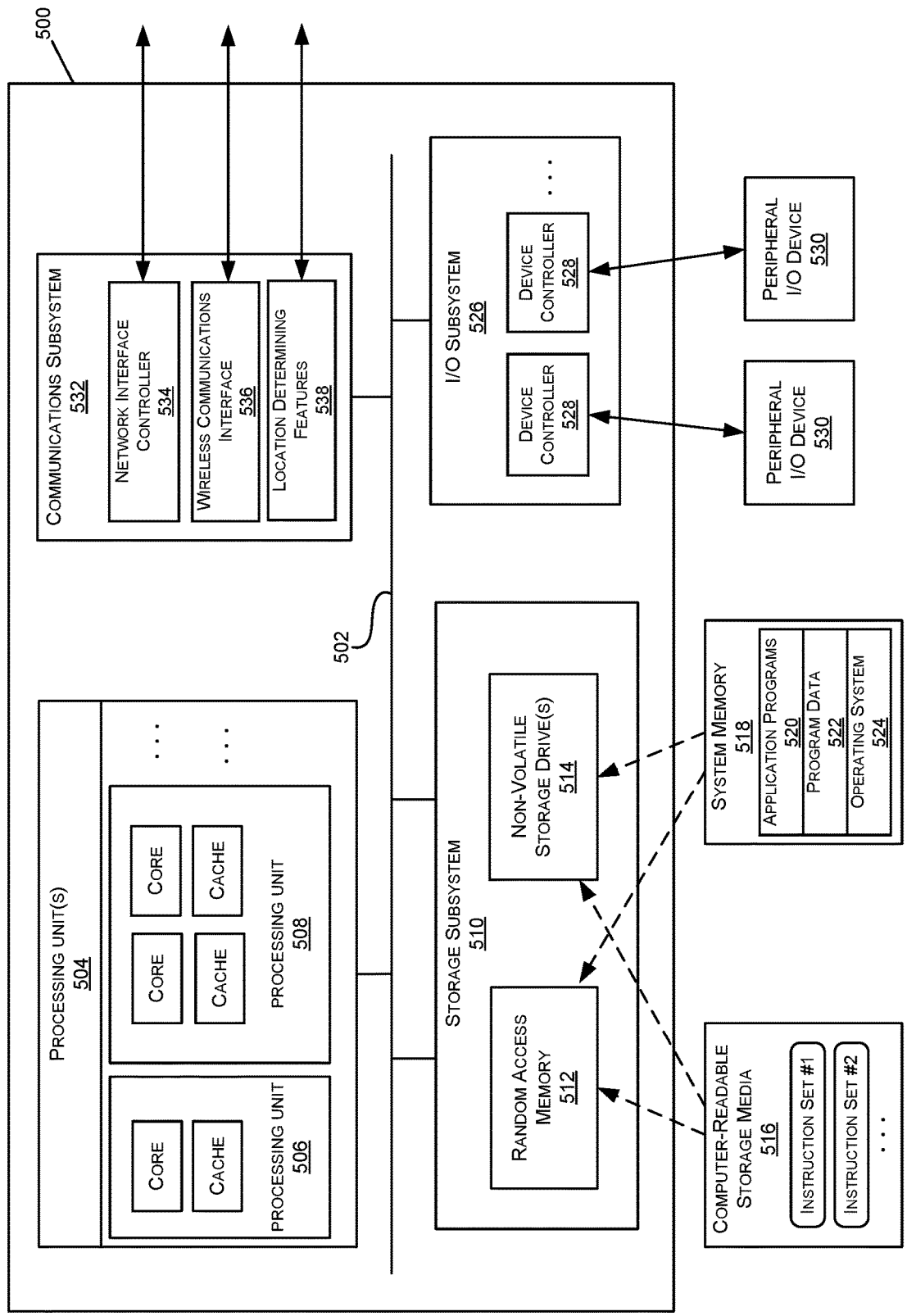
FIG. 5 is a block diagram illustrating the physical and logical components of a special-purpose computer device within a content distribution network, in accordance with one or more embodiments of the disclosure.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106 (e.g., a content receiver client device, intermediary content execution device, etc.), the supervisor device 110, and/or any of the servers 102, 104, 108, 112, 114, 116 (e.g., a diagnostic analyzer server). In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras or other image sensors, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring interactive assessment monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
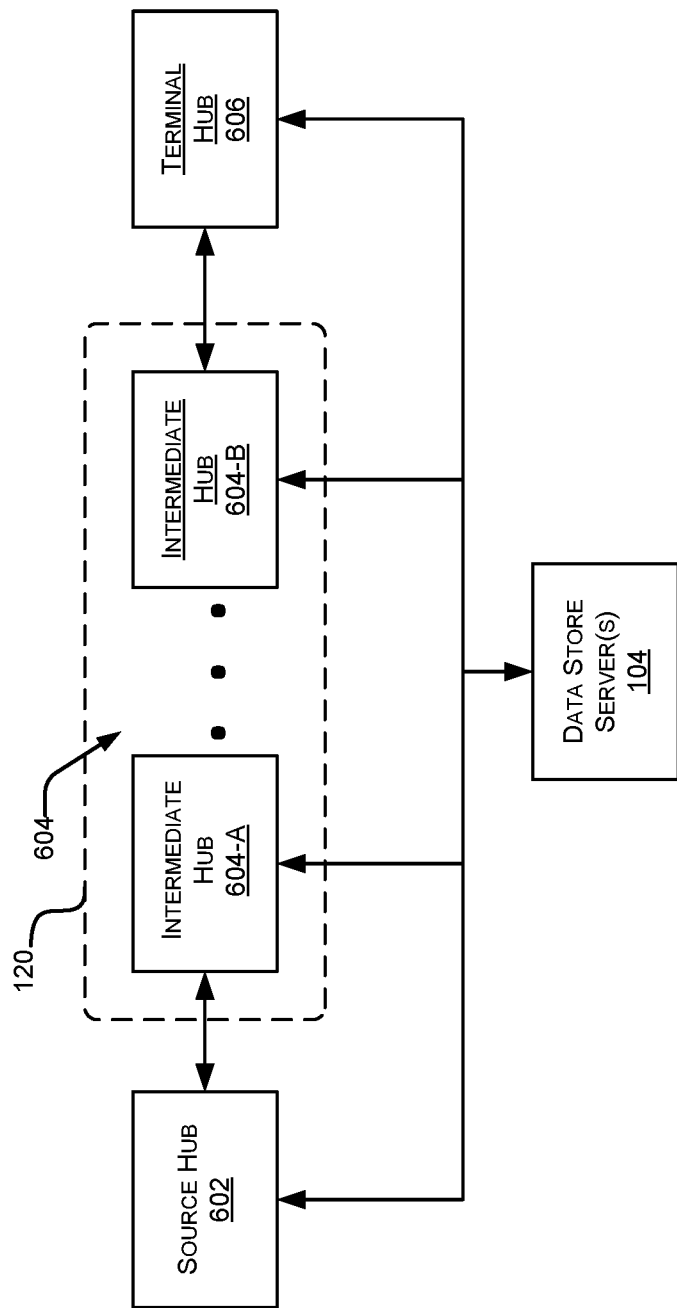
FIG. 6 is a block diagram illustrating a communication network in accordance with one or more embodiments of the disclosure.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatively connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
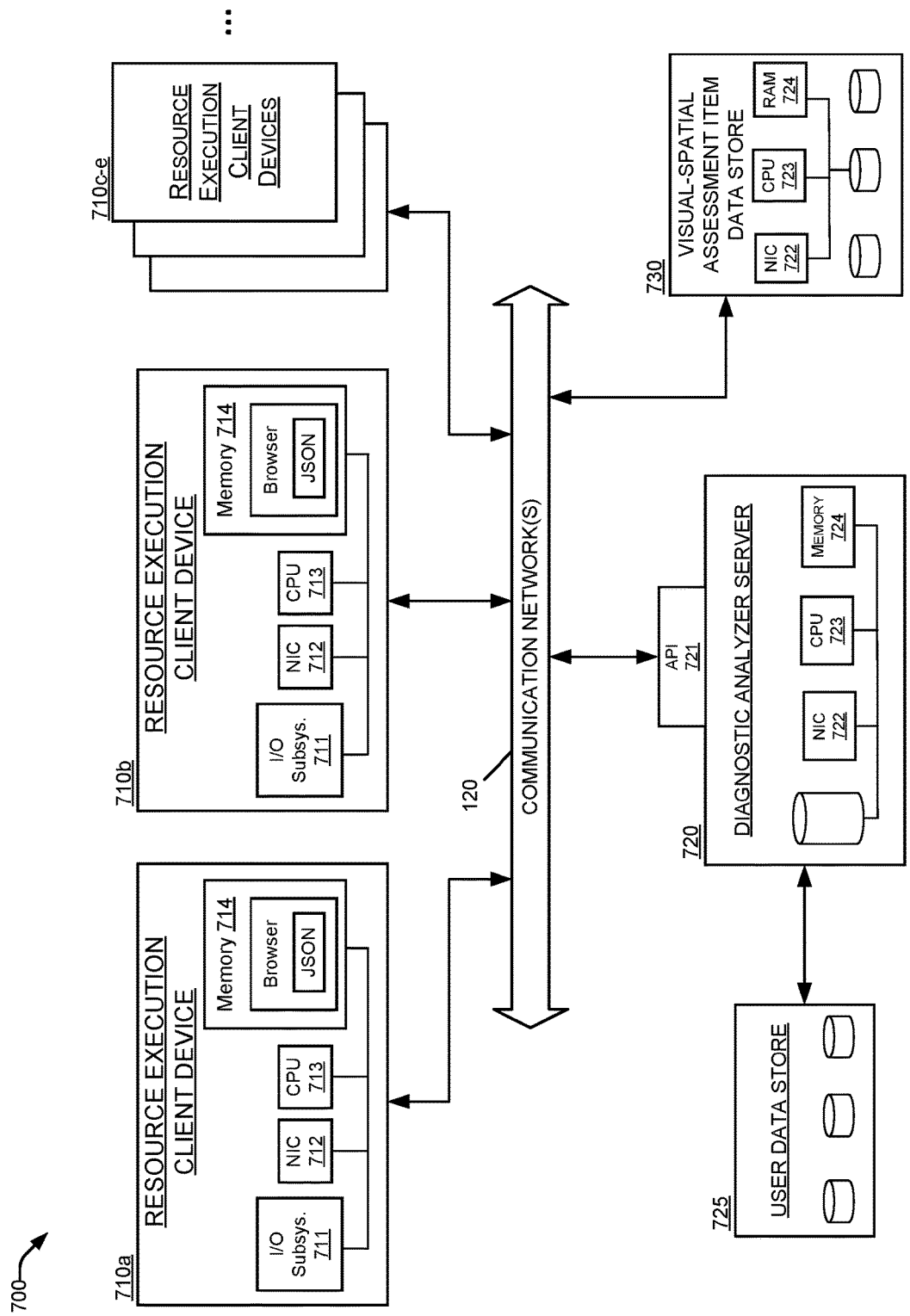
FIG. 7 is a block diagram illustrating an example content analysis and selection system for visual-spatial diagnostic content resources, according to one or more embodiments of the disclosure.

With reference now to FIG. 7, a block diagram is shown illustrating an example of a diagnostic content analysis and selection system 700 for providing content resources (e.g., visual-spatial diagnostic assessment items) to client devices. As shown in this example, an diagnostic content analysis and selection system 700 may include one or more resource execution client devices (or execution client devices) 710 configured to communicate with a diagnostic analyzer server 720. As discussed below, diagnostic analyzer server 720 may be configured to generate and evaluate content resources, and in particular embodiments, visual-spatial assessment items, and then to respond to requests to provide those resources to various execution client devices 710 individually or in sets within diagnostic modules. The diagnostic analyzer server 720 also may be configured to receive and evaluate responses and feedback to the visual-spatial assessment items, and then select additional assessment item for execution on particular execution devices and/or by particular content recipient users. Similarly, execution client devices 710 may operate in conjunction with one or more diagnostic analyzer server 720 and/or assessment item data stores 730 to receive and execute content resources locally, interact with content executors and/or end users during or after executing the content resources, and transmit responses, feedback, and additional execution data back to the diagnostic analyzer server 720. Although certain examples described herein are specific to particular types of visual-spatial assessment items (e.g., Wechsler Block Diagram tests), the system 100 may similarly support any types visual-spatial content and/or interactive content resources to be analyzed, selected, and executed. For example, different types of visual-spatial assessment items may include differential ability skills (DAS) tests, image similarity tests, and matrix reasoning tests, while other types of interactive content resources may include audio/video media resources, gaming software resources, eCommerce related resources, professional training and educational resources, assessments, etc.

As noted above, the particular content resources generated and selected by the content diagnostic analyzer server 720, and received and executed by the execution client devices 710, may be assessment resources (which also may be referred to as assessment items or assessments). As used herein, assessments may refer to interactive software and/or media packages configured for execution on one or more client devices 710. In some examples, visual-spatial assessments may be used to evaluate the visual-spatial perceptive reasoning abilities during medical or educational evaluations of particular individuals (or examinees). For instance, a visual-spatial assessment may be requested and received at an execution client device 710 by an authorized content executor, such as a specialized clinician or educator. Specific assessments may be designed to be administered only by specifically qualified content executors, such as school psychologists, special needs educators, clinical psychiatrists, speech pathologists, and the like. Specific assessments also may be designed to be administered to specific recipients or end users, such as particular patients or students within a predetermined age range or developmental level, or particular end users having a predetermined diagnosed condition, etc.

As data objects, assessments may correspond to individual and standalone content resources, or may correspond to groups of related resources. For instance, a visual-spatial perceptive reasoning assessment may refer to a group of related diagnostic visual-spatial content resources, each of which is a component or subtest of the assessment. In some cases, an assessment consisting of multiple components (e.g., visual-spatial assessment items or components) may be provided to an execution client device 710 as a single content resource, while in other cases client devices 710 may request/receive individual components of an assessment as separate content resources rather than requesting/receiving the entire assessment. Additionally, particular content executors (e.g., clinicians, therapists, etc.) may have licenses and/or subscriptions for individual assessments (each of which having one or more components) and/or for groups or packages of related assessments. As discussed below, the selections and recommendations of particular visual-spatial assessments (and/or particular visual-spatial assessment items) provided to content executors may be based in part on data specific to the end user (or examinee), such the examinee's age, perceptive reasoning skills/ability levels, an initial diagnosis, previous assessment results, etc. Additionally, such selections and recommendations also may be based on data specific to a separate content executor (e.g., educator, clinician, therapist, etc.) who may administer the assessment (when such assessments are not self-administered), such as whether the selected visual-spatial diagnostic assessments are covered by the existing licenses or subscriptions of the content executor.

Further, assessments and/or individual components within assessments have may various execution restrictions and requirements based on the execution client device, the content executor, and/or the end user receiving the assessment or component. For examples, certain visual-spatial assessments may have particular device hardware and/or network requirements, such as requirement for screen size, specific graphics and color requirements, network bandwidth requirements, etc., and thus may be prevented from being selected for (e.g., by the content diagnostic analyzer server 720) and/or executed on any execution client device 710 not having the required hardware components. Similarly, for network requirements, the content diagnostic analyzer server 720 may prevent an assessment item from being selected for and/or transmitted to an execution client device 710 during times when the current network conditions (e.g., current bandwidth, congestion levels, etc.) do not satisfy the network requirements, or when the current connection of the execution client device 710 to its access network (e.g., an LIE network or a 2G, 3G, or 5G, etc. wireless network) does not satisfy the network requirements associated with the assessment item.

Additional requirements associated with diagnostic assessments (and/or individual assessment items) may relate to the content executor, for example, the diagnostic analyzer server 720 may prevent a particular visual-spatial assessment from being selected for, transmitted to, or executed on a client device 710 unless the content executor (e.g., clinician, medial professional, educator, etc.) initiating and operating the assessment has the required authorization level. Such authorization levels may correspond to the access permissions of a particular content executor (e.g., determined based on their login credentials) on any of the servers or devices in the system 700. The authorization level of the content executor also may correspond to the professional qualifications of the content executor, such as professional credentials, degrees, certifications, and/or licenses of the particular clinician, educator, etc. Thus, certain assessments may be authorized to be selected for, transmitted to, and/or executed on client devices 710 by content executors have certain access permissions within the system 700 and/or having certain professional qualifications, while the same assessments may be restricted from other content executors not having the required access permissions and/or professional qualifications. Other types of assessment restrictions may be based on characteristics of the end user (e.g., patient or student) that will take the assessment, such as patients or students within a predetermined age range or developmental level, or particular end users having a predetermined diagnosed condition, etc.

Additionally or alternatively, the assessment requirements for content executors may be based on the organization of the content executor. That is, certain assessments may be authorized to be selected for, transmitted to, and/or executed by content executors associated with certain organizations but not others. Additional assessment requirements for content executors may be location based, so that only content executors currently within a particular geographic jurisdiction (e.g., one or more specific countries, states, counties, etc.), or at particular locations (e.g., specific hospitals, schools, medical offices, etc.), may be authorized for certain assessments. Further examples of the assessment requirements may include limitations on the number and/or frequency of executions of an assessment by a particular content executor, and restrictions on the times and days that an assessment may be executed by a particular content executor.

Any of the above requirements associated with assessments (and/or with individual components or items within assessments) may be implemented within and enforced by the system 700 using various techniques. As discussed below, system 700 may be an implementation of a content distribution network 100 in which execution client devices 710 are able to request, receive, and execute interactive content resources (e.g., visual-spatial assessment items) from one or more content data stores (e.g., visual-spatial assessment item store 730). Thus, any of the various types of assessment restrictions discussed above may be enforced by execution client devices 710 and/or content data stores 730 whenever a content executor attempts to download and/or initiate execution of an assessment on a client device 710. Additionally, as discussed below, the diagnostic analyzer server 720 may be configured to analyze correlations between content executors, and to select and recommend particular visual-spatial assessment items for particular content executors based on such analyses. Therefore, the any of the various types of assessment restrictions discussed above may be enforced by the diagnostic analyzer server 720, by selecting (or not selecting) diagnostic visual-spatial content resources for a particular examinee (and/or content executor) based on determinations that the examinee, the execution client device, and/or the content executor is (or is not) authorized for the particular visual-spatial content resources, etc. In such embodiments, the diagnostic analyzer server 720 may filter the visual-spatial content resources selected for and/or output to the content executor, to include only those interactive content resources that are authorized for execution by the content executor (and/or the executor's organization), on the client device 710, to the end user, at the current time and execution location, etc.

In some embodiments, the diagnostic content analysis and selection system 700 for interactive content resources may be integrated within, or configured to operate in collaboration with, one or more content distribution networks 100. For example, system 700 may be the same as, or may operate within or in collaboration with, any of the content distribution network (CDNs) 100 described above. Thus, specific examples of resource analysis and selection systems 700 may include, without limitation, educational and professional training systems and networks, interactive gaming systems and networks, clinical/educational assessment distribution systems and networks, and enterprise application systems and networks, websites and other Internet-based systems and networks. Accordingly, in the various different resource analysis and selection systems 700, content resources may correspond specifically to visual-spatial assessments and/or visual-spatial assessment items or packages, while in other systems 700 the resources may correspond to educational/training resources (e.g., in educational and professional training CDNs 100), evaluation or survey resources (e.g., in enterprise applications or online Internet-based CDNs 100), or product/media resources (e.g., in interactive gaming or media distribution CDNs 100), etc.

In some cases, the diagnostic analyzer server 720 may be implemented within one or more content management servers 102 and/or other CDN servers, the assessment item data store(s) 730 may correspond to one or more content servers 112 and/or data store servers 104, and execution client devices 710 may correspond to the user devices 106 and 110 described above in reference to CDN 100. Thus, within the diagnostic content resource analysis and selection system 700 (which may also be referred to as CDN 700 when describing certain embodiments), client devices 710 may interact with the diagnostic analyzer server 720 to upload content execution data and receive selections and/or recommendations of additional content resources to be executed. As discussed below, the diagnostic analyzer server 720 may maintain one or more additional data stores 725 storing data associated with particular end users (or examinees) and/or particular content executors (e.g., educators, clinicians, therapists, etc.). Additionally, client devices 710 may interact with assessment item data stores 730 to request/receive particular interactive content resources (e.g., visual-spatial diagnostic assessments/items) based on the selections determined by the diagnostic analyzer server 720. Although the diagnostic analyzer server 720, user data store 725, and visual-spatial assessment item data store 730 are shown as separate components in this example, in other embodiments they be implemented within the same servers and/or same data centers. In other examples, a diagnostic analyzer server 720 may be implemented using one or more computer servers, and other specialized hardware and software components, separately from any other CDN components such as content servers 112, content management servers 102, data store servers 104, and the like. In these examples, the diagnostic analyzer server 720 may be configured to communicate directly with client devices 710, or indirectly through content management servers 102 and/or other components and communications networks of the CDN 700.

In order to perform these features and other functionality described herein, each of the components and sub-components discussed in the example diagnostic content analysis and selection system 700 for interactive content resources may correspond to a single computer server or a complex computing system including a combination of computing devices, storage devices, network components, etc. Each of these components and their respective subcomponents may be implemented in hardware, software, or a combination thereof. Certain execution client devices 710 may communicate directly with the diagnostic analyzer server 720, while other client devices 710 may communicate with the diagnostic analyzer server 720 indirectly via one or more intermediary network components (e.g., routers, gateways, firewalls, etc.) or other devices (e.g., content management servers 102, content servers 112, etc.). Although the physical network components have not been shown in this example so as not to obscure the other elements depicted in the figure, it should be understood that any of the network hardware components and network architecture designs may be implemented in various embodiments to support communication between the servers and devices in the system 700. Additionally, different client devices 710 may use different networks and networks types to communicate with the diagnostic analyzer server 720, including one or more telecommunications networks, cable networks, satellite networks, cellular networks and other wireless networks, and computer-based IP networks, and the like. Further, certain components within system 700 may include special purpose hardware devices and/or special purpose software, such as those included in I/O subsystems 711 and client application memory 714 of the client devices 710, as well as those within the API 721 and processing engines within the memory 724 of the diagnostic analyzer server 720, discussed below.

Although the functionality of system 700 may be described below in terms of a client-server model, it should be understood that other computing environments and various combinations of servers and devices may be used to perform the functionality described herein in other examples. For instance, although the analysis of visual-spatial diagnostic assessments may be performed directly on client devices 710, the determinations of correlations between examinees or content executors, and the selections of visual-spatial content resources for particular examinees/content executors, may be performed by a web-based server (e.g., diagnostic analyzer server 720) in collaboration with a client application (e.g., web browser or standalone client application) executing on client devices 710, in other cases these techniques may be performed entirely by a specialized diagnostic analyzer server 720, or entirely by software executing on a client device 710. In other examples, a client-server model may be used as shown in system 700, but different functional components and processing tasks may be allocated to the client-side or the sever-side in different embodiments. Additionally, the assessment item (or content resource) data store 730 and user data store 725 may be implemented as separate servers or storage systems in some cases, and may use independent hardware and software service components.

Execution client devices 710 may include desktop or laptop computers, smartphones, tablet computers, and other various types of computing devices, each of which may include some or all of the hardware, software, and networking components discussed above. Specifically, a client device 710 may be any computing device with sufficient processing components, memory and software components, and I/O system components for interacting with users (e.g., end user examinees and/or content executors), and with the diagnostic analyzer server 720 and data stores 730 to select and receive visual-spatial assessments (or other content resources) for execution. Accordingly, client devices 710 may include the necessary hardware and software components to establish the network interfaces, security and authentication capabilities, and capabilities for assessment resource storage, validation, and execution. In this example, client devices 710 may each include an I/O subsystem 711, network interface controller 712, a processing unit 713, a memory 714 configured to operate client software applications. Client device 710 may be configured to receive and execute various programmatic and graphical interfaces to define, construct, validate, and store assessment resources having various types of assessment components and functionality. Accordingly, each I/O subsystem 711 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different client devices 710 may support different input and output capabilities within their I/O subsystems 711, and thus different types of interactions with assessments/components may be compatible or incompatible with certain client devices 710. For example, certain visual-spatial assessment items (or other types of content resources) may require specific types of processors, minimum screen size, graphics components, network components, or I/O components in order to be optimally rendered and presented on a client device 710. In some embodiments, users may establish user-specific preferences for executing specific types of assessments or other resources on specific types of client devices 710. Additionally, as shown in this example, the memory 714 of client devices 710 may include web browser software having browser-native support for JavaScript Object Notation (JSON). JSON data objects may be generated and stored within the browser memory, and used to implement the user interactions and feedback logic for visual-spatial assessments items and/or other types of interactive content resources.

In some embodiments, the diagnostic analyzer server 720 may generate and provide the software interfaces (e.g., via API 721, a web-based application or other programmatic or graphical interface techniques) used by the execution client devices 710 to receive content resource execution data and provide selections of visual-spatial content resources to client devices 710. In response to receiving and validating login credentials from a client device 710, or at predetermined times before logins are received, the diagnostic analyzer server 720 may access the user data store 725 and/or other data sources to retrieve user-related data and determine selections for the visual-spatial content sources to be provided to the client device 710. In other to perform the tasks described herein, diagnostic analyzer servers 720 and/or assessment item data stores 730 may include components such as network interface controllers 722, processing units 723, and memory 724 configured to store server software, handle authentication and security, and store/retrieve visual-spatial assessment items and other content resources from data stores 730, etc. The diagnostic analyzer server 720 and assessment item data store(s) 730 may be implemented as separate software (and/or storage) components within a single computer server in some examples, while in other examples may be implemented as separate computer servers/systems having separate dedicated processing units, storage devices, and/or network components.

Figure 8:
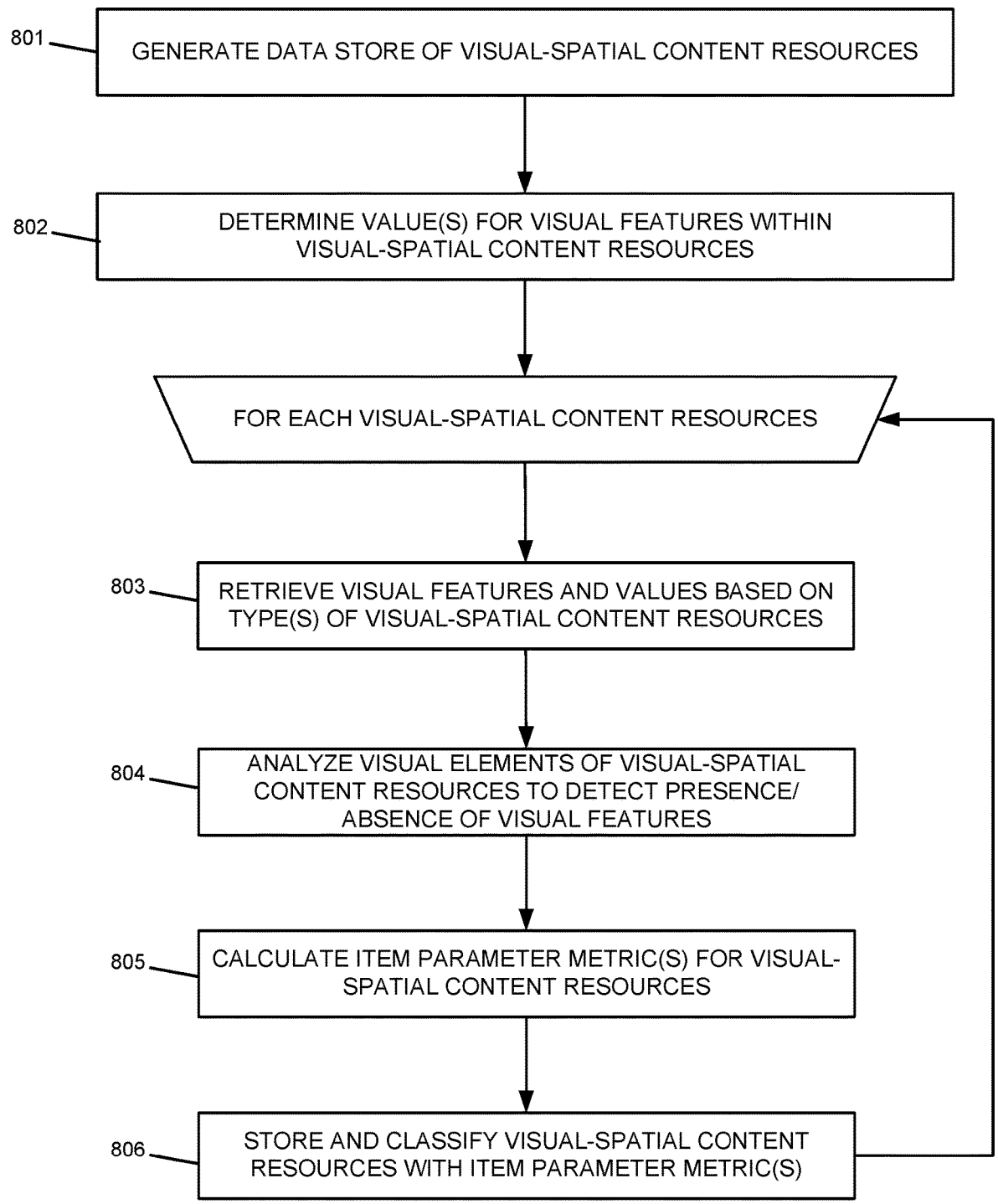
FIG. 8 is a flow diagram illustrating an example process of generating, storing, and analyzing sets of diagnostic visual-spatial content resources, according to one or more embodiments of the disclosure.

Referring now to FIG. 8, a flow diagram is shown illustrating a process of generating, storing, and analyzing/evaluating sets of diagnostic visual-spatial content resources. As described below, the steps in this process may be performed by one or more components in the diagnostic and content analysis and selection system 700 described above. For example, each of the steps 801-806 may be performed by a diagnostic analyzer server 720 in communication with one or more content execution devices 710, visual-spatial assessment item data stores 730, and/or user data stores 725. However, in other examples, one or more of steps 801-806 may be performed by client device 710 and/or data stores 725-730. It should also be understood that the various features and processes described herein, including generating and evaluating stores of visual-spatial assessment items for execution on client devices 740, as well as receiving and evaluating the response/feedback data associated with the execution of the diagnostic modules, need not be limited to the specific systems and hardware implementations described above in FIGS. 1-7.

Figure 9A:
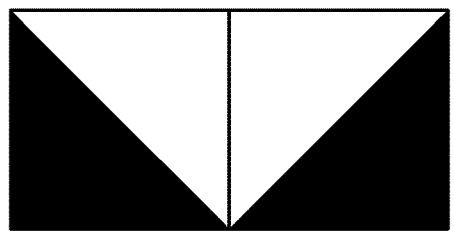
FIGS. 9A-9O are a series of example block diagrams illustrating visual features that may be detected within block design pattern assessment items, according to one or more embodiments of the disclosure.
Figure 9B:
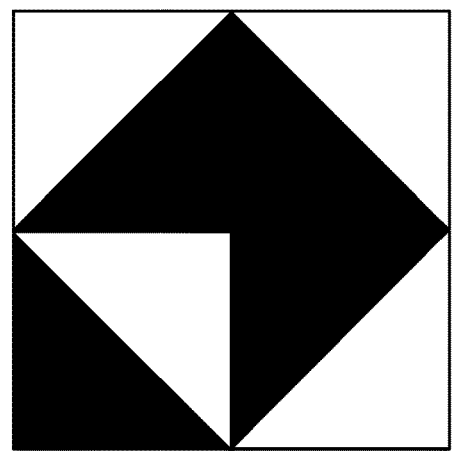
Figure 9C:
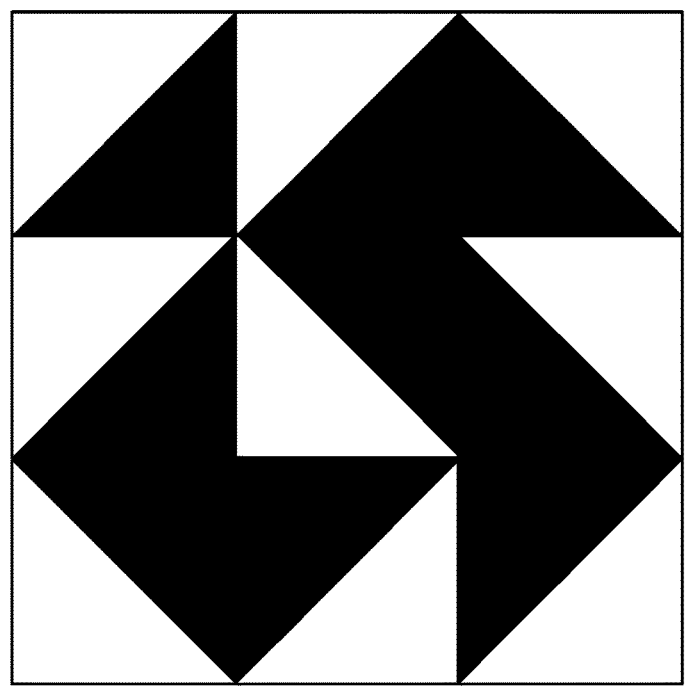
Figure 9D:
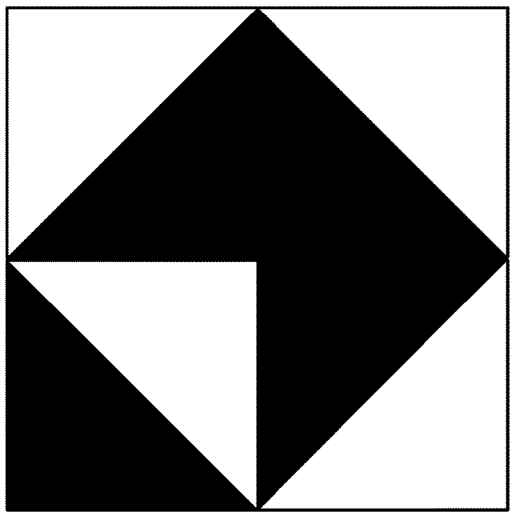
Figure 9E:
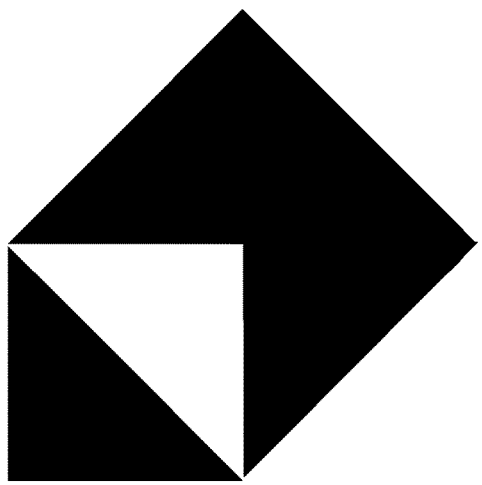
Figure 9F:
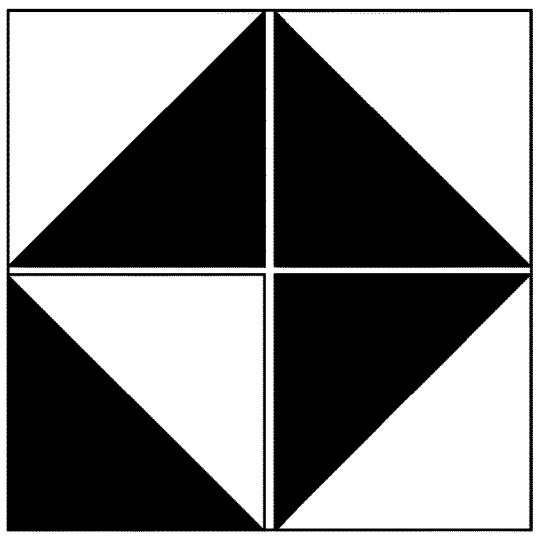
Figure 9G:
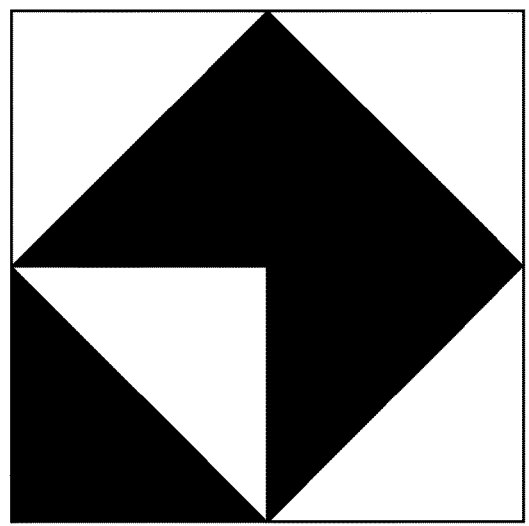
Figure 9H:
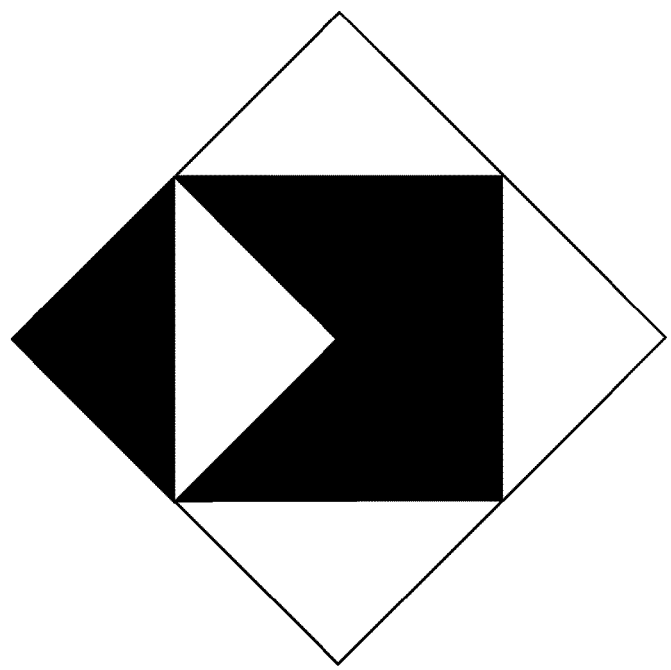
Figure 9I:
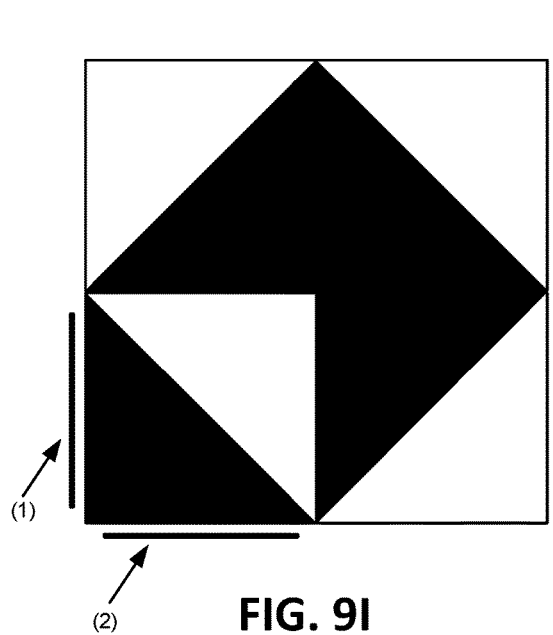
Figure 9J:
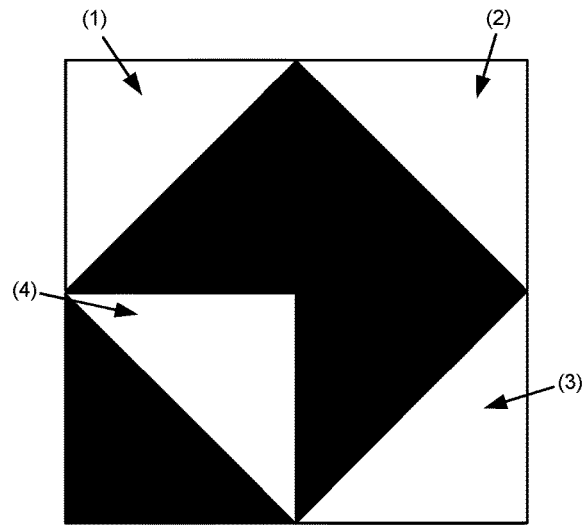
Figure 9K:
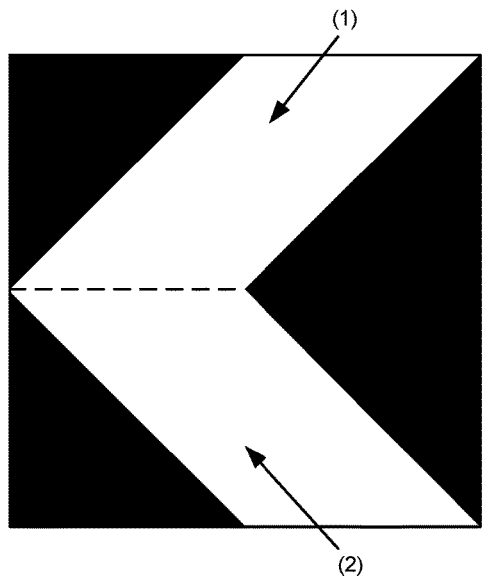
Figure 9L:
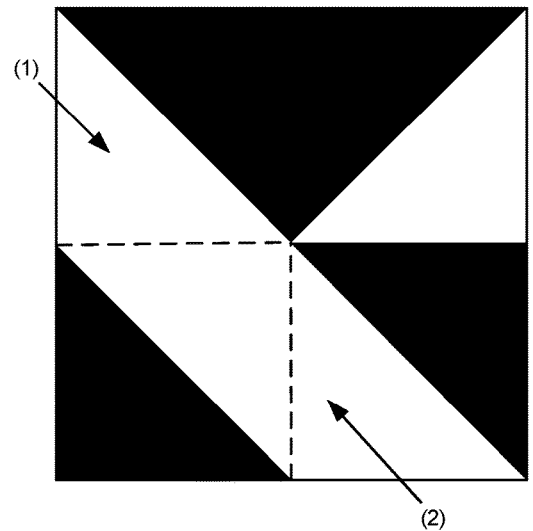
Figure 9M:
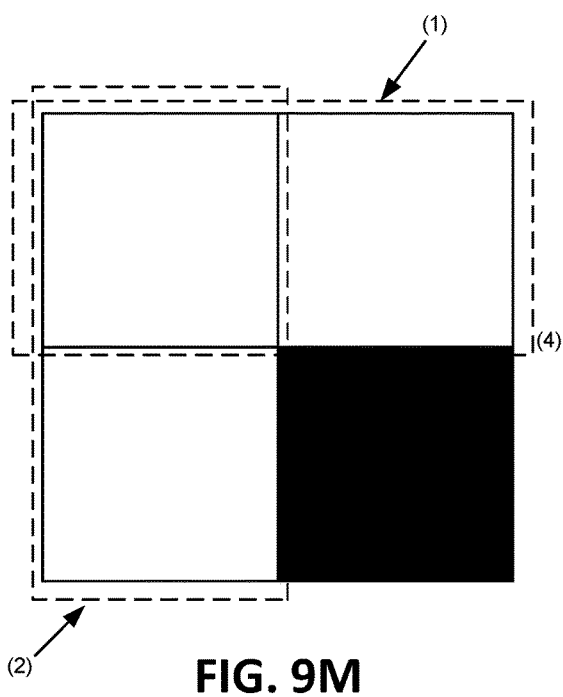
Figure 9N:
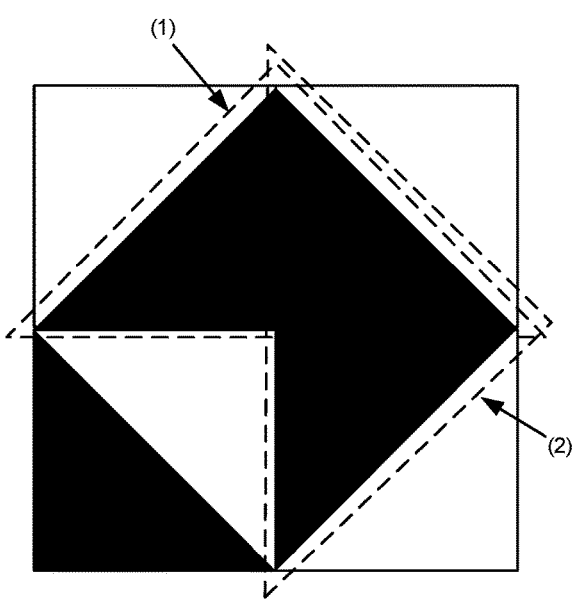
Figure 9O:
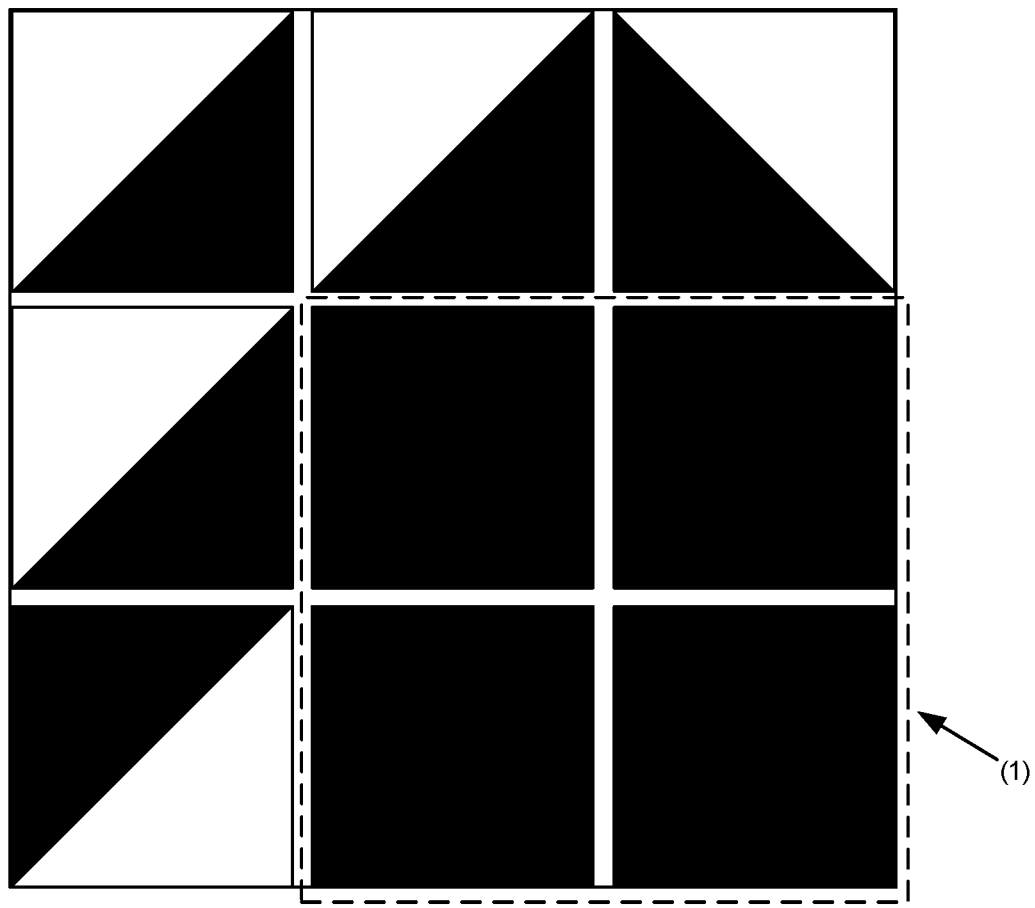

In step 801, a diagnostic analyzer server 720 may generate a set of visual-spatial diagnostic content resources. As discussed above, in some embodiments, the visual-spatial diagnostic content resources may correspond one or more types of Wechsler Block Design tests and/or similar visual-based problems used to evaluate perceptive reasoning abilities of examinees. For example, in Wechsler Block Design tests and similar spatial-visual assessments, an examinee is presented with an image or a constructed model, and is asked to use one-color or two-color blocks to recreate the design within a specified time limit. Different types of Wechsler Block Design tests may include 2-block (1×2), 4-block (2×2), or 9-block (3×3) configurations, where each block has a combination of white and non-white triangles, and where each triangle takes up one-half of one surface on of block. Several examples of Wechsler Block Design patterns are shown in FIGS. 9A-9O, discussed in more detail below. Whether the visual-spatial assessment items generated in step 801 are Wechsler Block Design patterns, or other types of visual-spatial diagnostic assessment items (e.g., differential ability skills (DAS) tests, image similarity tests, matrix reasoning tests, etc.), the assessment items generated may have visual some content, and thus may be include 2D or 3D computer images files, or other data representing the visual content that is capable of being rendered visually on a display device 710.

In some embodiments, the generation of visual-spatial assessment items in step 801 may be performed in response to a specific request from a client device 710 (which may be initiated manually by an authorized user, or via an automated process) to generate and evaluate some number of new visual-spatial assessment items. For example, a client process may request the random generation and evaluation/classification of N number of new Wechsler Block Design patterns (or other visual-spatial assessment items). In other examples, a system 700 may generate and store a complete library of all possible combinations and permutations of visual-spatial assessment items, for types of visual-spatial assessment items that are based on arrangements of geometric shapes and thus have only a finite number of possible items. As noted above, the diagnostic analyzer server 720 may store data representing the generated visual-spatial content resources (e.g., digital image data or other renderable content data) in a visual-spatial assessment item data store 730.

In step 802, the diagnostic analyzer server 720 may determine a set of values associated with various different visual features within the received visual-spatial content resources (e.g., assessment items). As discussed in more detail below, visual features (or visual characteristics) of a visual-spatial assessment item may include features such as axis symmetry, visual gridlines and/or borders within the visual content, visual image orientation, the presence (or absence) of specific shapes or patterns within visual content, a threshold amount (or ratio) of unused space within the visual content, and/or others discussed herein. In step 802, the server 720 may perform one or more processes to determine which visual features do and do not correlate to item parameter metrics (e.g., item difficulty). For example, in step 802, for a particular training set of Wechsler Block Design content resources, the server 720 may determine that a first feature (e.g., grid lines) has a first value (A) that represents a correlation between the presence of gridlines in the visual assessment item and the difficulty of the item, while a second feature (e.g., y-axis symmetry) has a second value (B) that represents a correlation between the presence of y-axis symmetry in the visual assessment item and the difficulty of the item, and so on.

Thus, the determination of values associated with features in step 802 may correspond to determining the degree to which those features correlate with item parameter metrics such as item difficulty, discrimination, etc. In some examples, the values assigned in step 802 may be one-to-one mappings of features to values. Additionally or alternatively, certain values assigned in step 802 may be mappings of combinations of features to values (e.g., a correlation between the presence of a combination of features, and the difficulty of the item). Additionally, in the case of visual-spatial content resources, the features may be visual features (or visual characteristics), such as those discussed below. However, for other types of assessment items (e.g., mathematical assessment items, language or grammatical assessment items, etc.) different types of features (visual or non-visual features) may be identified and values may be assigned to those features in step 802.

In order to perform the determination in step 802, the diagnostic analyzer server 720 may implement one or more mathematical models and/or machine-learning algorithms using as input the data store of content resources generated or received in step 801. In some embodiments, the server 720 may use non-linear regression (e.g., logistic regression) models. Additionally or alternatively, the server 720 may use extensions and/or implementations of the item response theory (IRT) model, including the Rasch model, 2-parameter IRT model, 3-parameter IRT model, and/or other IRT model.

As shown in FIG. 8, steps 803-806 may be performed iteratively (e.g., in parallel or in sequence) for each of the visual-spatial content resources generated in step 801. Steps 803-806, described in more detail below, relate to the evaluation and classification of the visual-spatial content resources, based one or more item parameter metrics that may be calculated for each visual-spatial assessment item. A parameter metric for a visual-spatial assessment item, e.g., item difficulty and discrimination, may correspond to a prediction regarding the level of perceptive reasoning abilities and/or amount of effort (e.g., measured by solving time, number of attempts, etc.) that will be required for examinees to successfully complete the assessment item. For example, particularly difficult and/or complex Wechsler Block Design patterns might only be solvable within the time allotted by examinees having advanced perceptive reasoning abilities, while other less difficult and/or simpler patterns may be solved within the time allotted by examinees having less perceptive reasoning abilities and even faster by those having advanced skills.

As discussed in the steps below, the diagnostic analyzer server 720 may analyze the visual content associated with each visual-spatial content resource, programmatically identify particular visual features based on the diagnostic type of the assessment item, and then use mathematical modeling techniques and/or machine learning algorithms to calculate one or more item parameter metrics for each visual-spatial content resource. Thus, the techniques described may provide significant technical advantages over conventional systems that used manual generation and/or manual classification of visual-spatial content resources. Not only will the classifications of visual-spatial assessment items described herein be performed more efficiently than manual classifications, but the mathematical modeling and/or machine-learning techniques assure that the item parameter metrics are calculated objectively and uniformly across the system. Thus, a clinician's or educator's own perceptions of the difficulties of a particular visual-spatial content resources will not affect the diagnosis of the examinee.

Additionally, conventional techniques of storing and administering the same fixed set of visual-spatial assessment items in order to guarantee uniformity in perceptive reasoning assessments allow for a number of technical deficiencies in the diagnostic process. For instance, using fixed sets of assessment items may result in situations when examinees and/or test administers may see the same assessment items on multiple occasions, intentionally or unintentionally, which may lead to biased and unreliable results. Additionally, thorough and accurate perceptive reasoning assessments may require the examinee to attempt a large number of visual-spatial assessment items, which can lead to distraction, mental fatigue, and less accurate assessment results. These inefficiencies and inaccuracies in diagnostic assessments may be addressed by the techniques described herein. For example, by analyzing specific visual features of visual-spatial assessment items, and then using mathematical modeling and/or machine-learning techniques, the resulting item parameter metric (e.g., item difficulty) calculations are more accurate and more efficient. As a result, predetermined fixed sets of assessment items may be replaced by variable sets of assessment items, which may be selected on-the-fly during runtime and/or generated dynamically for each requested assessment, thus avoiding the possibility of examinees or test administers having previously encountered the same assessment items or sets of assessment items. Additionally, the objective and improved accuracy of the item parameter metrics may allow for perceptive reasoning assessments to be more targeted to specific examinees, and to be refined/tuned dynamically during the assessment to more quickly hone in on the examinee's overall level of perceptive reasoning abilities and/or examinee's individual strengths and deficiencies within the field of perceptive reasoning. As discussed below, this may also allow the diagnostic analyzer server to detect previously undetectable examinee anomalies (and corresponding diagnoses) during visual-spatial diagnostic assessments.

In step 803, the diagnostic analyzer server 720 may retrieve data identifying the set of visual features to be detected in the visual-spatial content resources generated in step 801, and the values determined in step 802 associated with each of the retrieved visual features. In some embodiments, the diagnostic analyzer server 720 may be configured to detect a common set of visual features for any visual-spatial assessment items. For example, a common set of visual features that may apply to different types of visual-spatial assessment items may include visual features such as X-axis symmetry, Y-axis symmetry, X- and Y-axis symmetry, Z-axis symmetry (for 3-dimension visual content), visual gridlines and/or borders within the visual content, a vertical image orientation, a horizontal image orientation, the presence or absence of specific shapes or patterns within visual content, threshold amount (or ratio) of unused space (e.g., white space) within the visual content, etc.

Additionally or alternatively, the diagnostic analyzer server 720 may be configured to determine the particular type of the visual-spatial assessment items generated in step 801, and then to detect a specialized set of visual features that depends on the type of the visual-spatial assessment items. For example, the following paragraphs describe an illustrative set of visual features that may be programmatically detected by the diagnostic analyzer server 720 for Wechsler Block Design patterns. In various embodiments, the diagnostic analyzer server 720 may detect any or all of these visual features, and as discussed below, to use the detected presence or absence of these features as input to the mathematical modeling and/or machine-learning techniques used to calculate item parameter metrics (e.g., item difficulty) for the visual-spatial assessment items. In other examples involving Wechsler Block Design patterns or other types of visual-spatial assessment items, different visual features and/or combinations of features may be detected.

Referring now to FIGS. 9A-9O, several example block patterns are shown consistent with a Wechsler Block Design perceptive reasoning assessment. These examples, discussed below, illustrate several different visual features may be detected and analyzed by a diagnostic analyzer server 720. Each of the visual features described below may, alone or in combination, and to a greater or lesser degree, drive the parameters of the block design assessment items, e.g., item difficulty and discrimination.

In certain embodiments, the diagnostic analyzer server 720 may be configured to detect the visual feature corresponding to the number of blocks present in a block design pattern. In Wechsler Block Design tests, design patterns typically may be created out of 2 blocks (e.g., a 1×2 pattern shown in FIG. 9A), 4 blocks (e.g., a 2×2 pattern shown in FIG. 9B), or 9 blocks (e.g., a 3×3 pattern shown in FIG. 9C). In general, block design assessment items having larger numbers of blocks may have higher difficulty levels. The diagnostic analyzer server 720 may be configured to perform digital image analysis and/or other programmatic techniques to determine the number of blocks within these block design patterns.

In certain embodiments, the diagnostic analyzer server 720 may be configured to detect the presence or absence of an outside border in a block design pattern. In Wechsler Block Design tests, block design patterns may be generated with an outside border (e.g., as shown in FIG. 9D), or without an outside border (e.g., as shown in FIG. 9E). Outside border lines may be rendered in black, as in this example, or may be rendered in a different color to contrast the filled-in triangle sections. The presence of an outside border may, in some cases, have the effect of reducing the difficulty of a block design assessment item. The diagnostic analyzer server 720 may be configured to perform digital image analysis and/or other programmatic techniques to determine whether or not a visible outside border is present in the within block design patterns.

In certain embodiments, the diagnostic analyzer server 720 may be configured to detect the presence or absence of individual block borders, or gridlines, in a block design pattern. In Wechsler Block Design tests, block design patterns may be generated with gridlines (e.g., as shown in FIG. 9F), or without gridlines (e.g., as shown in FIG. 9G). Gridlines may be rendered in black, as in this example, or may be rendered in one or more different colors (e.g., blue or red) or patterns (e.g., dashed gridlines) to contrast the filled-in triangle sections and/or separate outside border lines. The presence of gridlines may, in some cases, have the effect of reducing the difficulty of a block design assessment item. The diagnostic analyzer server 720 may be configured to perform digital image analysis and/or other programmatic techniques to determine whether or not gridlines are present in the within block design patterns.

In certain embodiments, the diagnostic analyzer server 720 may be configured to detect whether or not a rendered block design pattern is rotated. In Wechsler Block Design tests, certain block design patterns may be rotated some number of degrees (e.g., 30 degrees, 45 degrees, 60 degrees, etc.), as shown in FIG. 9H. Visual rotation of a block design pattern may generally have the effect of increasing the difficulty of a block design assessment item. The diagnostic analyzer server 720 may be configured to perform digital image analysis and/or other programmatic techniques to determine whether or not a block design pattern is rotated.

In certain embodiments, the diagnostic analyzer server 720 may be configured to detect the number of perimeter segments that are covered by filled-in portions of the design block pattern. In some cases, this visual feature may be referred to as the "red perimeter" number, because Wechsler Block Design tests are often visually rendered with red triangles rather than black as shown in this examples. This visual feature is illustrated in FIG. 9I, which shows a 2×2 block design pattern in which two of the eight perimeter segments are covered by filled-in portions of the design pattern. Higher number of covered perimeter segments may, in some cases, reduce the difficulty level of block design assessment item. The diagnostic analyzer server 720 may be configured to perform digital image analysis and/or other programmatic techniques to determine the numbers of covered and uncovered perimeter segments.

In certain embodiments, the diagnostic analyzer server 720 may be configured to detect the numbers of filled-in (or colored) triangles and the numbers of not filled in (or white) triangles in a design block pattern. In some cases, this visual feature may be referred to as the "white halves" number, because Wechsler Block Design tests generally use red or white triangles that take up one half of a block. This visual feature is illustrated in FIG. 9J, which shows a 2×2 block design pattern in having four "white halves" and four "red halves." In some cases, a block design patterns with high ratios and low ratios of white halves may have relatively lower difficulty levels, while middle range ratios of white halves (e.g., for block design patterns having approximately the same numbers of white and red triangles) may have relatively higher difficulty levels.

In certain embodiments, the diagnostic analyzer server 720 may be configured to detect the number of 2×1 parallelograms formed by two adjacent triangles in a design block pattern. In some cases, this visual feature may be referred to as the number of "white stripes" (for white 2×1 parallelograms) or number of "red stripes" (for red 2×1 parallelograms). This visual feature is illustrated in FIG. 9K which shows a 2×2 block design pattern having two white stripes, and in FIG. 9L which shows another 2×2 block design pattern having two overlapping white stripes. The dotted lines are shown in these examples to illustrate the white stripes, but need not be shown in the actual block design pattern presented to the examinee during the assessment. The diagnostic analyzer server 720 may be configured to perform digital image analysis and/or other programmatic techniques to determine the numbers of white stripes and/or red stripes.

In certain embodiments, the diagnostic analyzer server 720 may be configured to detect the number of 2×1 rectangles formed by two adjacent single-color blocks of the same color in a design block pattern. In some cases, this visual feature may be referred to as the number of "white rectangles" (for white 2×1 rectangles) or number of "red rectangles" (for red 2×1 rectangles). This visual feature is illustrated in FIG. 9M which shows a 2×2 block design pattern having two white rectangles. The dotted lines are shown in this example to illustrate the white rectangles, but need not be shown in the actual block design pattern presented to the examinee during the assessment. The presence of white or red rectangles generally may have the effect of reducing the difficulty level of a block design pattern. The diagnostic analyzer server 720 may be configured to perform digital image analysis and/or other programmatic techniques to determine the numbers of white generally and/or red generally.

In certain embodiments, the diagnostic analyzer server 720 may be configured to detect the number of larger triangles formed by multiple smaller triangles from adjacent blocks in a design block pattern. This visual feature is illustrated in FIG. 9N, which shows a 2×2 block design pattern having two larger red triangles (shown as black) formed by triangles from multiple blocks. The dotted lines are shown in these examples to illustrate the larger triangles, but need not be shown in the actual block design pattern presented to the examinee during the assessment. The diagnostic analyzer server 720 may be configured to perform digital image analysis and/or other programmatic techniques to determine the numbers of larger triangles formed from multiple blocks.

In certain embodiments, the diagnostic analyzer server 720 may be configured to detect the number of larger squares formed by multiple blocks adjacent blocks of the same color in a design block pattern. This visual feature is illustrated in FIG. 9O, which shows a 3×3 block design pattern having a larger red square (shown as black) formed by four adjacent blocks. The dotted lines (and/or the white gridlines) are shown in these examples to illustrate the larger square, but need not be shown in the actual block design pattern presented to the examinee during the assessment. The presence of white or red larger squares generally may have the effect of reducing the difficulty level of a block design pattern. The diagnostic analyzer server 720 may be configured to perform digital image analysis and/or other programmatic techniques to determine the numbers of larger squares formed from multiple blocks.

Returning now to FIG. 8, in step 804 the diagnostic analyzer server 720 may analyze the various visual elements of the visual-spatial content resources in order to detect the presence or absences of these features. As discussed above, the particular features that the diagnostic analyzer server 720 detects (or attempts to detect) in step 804 may depend on the particular type of the visual-spatial content resources. For example, for Wechsler Block Design content resources, some or all of the visual features discussed above may be detected within the corresponding block design pattern. For other types of visual-spatial content resources, the server 720 may extract and analyze the visual contents/visual elements of the content resource to detect different sets of visual features, including general features such as symmetry with respect to one or more axes, gridlines, borders, rotation, specific shapes or patterns within the visual content, and/or ratios of filled versus white space within the visual content, etc., and/or type-specific visual features (e.g., specific to a cognitive differential ability skills (DAS) test, an image similarity test, or a matrix reasoning test, etc.).

The programmatic processes used by the diagnostic analyzer server 720 to detect the visual features in step 804, may be depend on how the visual content of the visual-spatial resources are stored. For example, if the visual-spatial content resource is stored in whole or in part as a digital image, then the diagnostic analyzer server 720 may use image renderers and/or image analysis techniques to recognize the visual features within the content resource. Alternatively, if a visual-spatial content resource is stored in another format (e.g., a tag-based markup language), then the diagnostic analyzer server 720 may parse the markup language and/or other visual format data to determine the presence or absence of the visual features within the content resource. Further, although certain examples described herein may refer to detecting either the presence or absence of visual features, it should be understood that some embodiments include detecting particular numbers, ratios, and/or degrees of visual features as well, and that these specific numbers, ratios, and degrees of visual features may be inputs to the mathematical modeling and/or machine-learning based techniques for calculating item parameter metrics.

In step 805, the diagnostic analyzer server 720 may calculate one or more item parameter metrics (e.g., item difficulty, discrimination, etc.) for the visual-spatial content resource. In some embodiments, the server 720 may execute one or mathematical models/algorithms, and/or one or more machine-learning based techniques, using as inputs the visual features detected in step 804. For instance, the server 720 may initiate a mathematically-based statistical algorithm, based on, for example, Item Response Theory (IRT), Bayesian Network (Bayes net), non-linear regression (e.g., Logistic Regression), Discriminant Function Analysis, Principal Factor Analysis (PFA), linear and/or non-linear multiple regression models, multivariate base rate analysis, or the like. Additionally or alternatively, the diagnostic analyzer server 720 may use one or more trained machine-learning based algorithms to generate the item parameter metric in step 805. In any of these cases, the input to the algorithms may include any combination of the visual features detected within the visual-spatial content resource in step 804, and the output may be an item parameter metric value (e.g., an integer or floating value within a predetermined range) corresponding to a predictive analysis of the performance of a typical examinee when completing the assessment item. Thus, an item parameter metric value may represent, and may be used to predict, completion times for visual-spatial assessment items, success rates for different examinees, likely numbers of failed attempts, and the like. Finally, although steps 802 and 805 may be performed separately and independently as shown in this example, in certain embodiments steps 802 and 805 may use the similar or identical mathematical/algorithmic techniques, and/or may be performed as part of a single process (e.g., steps 802 and 803 may be embedded within step 805).

Using these various mathematical modeling and/or machine-learning based techniques may result in determinations that certain visual features or combinations of visual features may correlate to the parameters of the assessment items. Some visual features or combinations of visual features may correlate to higher difficulty levels for the assessment item, while other visual features or combinations of visual features may correlate to lower difficulty levels for the assessment item. For instance, the presence of a particular visual feature alone may be determined by the server 720 to raise the difficulty level of the visual-spatial assessment item, while the presence of that same visual feature along with an additional visual feature may be determined by the server 720 to lower the difficulty level of the visual-spatial assessment item, and vice versa.

Further, in some embodiments, multiple item parameter metrics (e.g., item difficulty, discrimination, etc.) may be calculated for single visual-spatial content resource. For instance, through statistical analyses, machine learning, and/or other programmatic techniques, the diagnostic analyzer server 720 may determine that visual-spatial content resource has a relatively high difficulty level for one set of examinees and a relatively low difficulty level for another set of examinees. To illustrate, the mathematical and/or machine learning analyses performed by the server 720 may determine that, while teenage users generally perform at the same level as 55-70 year old users on standard batteries of visual-spatial assessment items, there are certain assessment items having particular features or combinations of features on which one age group outperforms the other. In more general terms, different subgroups of end users/examinees, such as users in different age groups, different education levels, different experiences or skill sets, and/or having clinical classifications or diagnoses, may be found to perform at relatively different ability levels that are disproportionate to any difference in general performance levels between the two groups, for certain visual-spatial content resources. In such cases, the server 720 may calculate different item parameter metrics in step 805 for each different (disproportionately divergent) subgroup of examinees, for the particular visual-spatial content resource. To perform such calculations, the server 720 may use similar statistical algorithms and/or similar trained machine-learning techniques, based only on the performance data of the individual subgroups.

In still other examples, the diagnostic analyzer server 720 may calculate different item parameter metrics for the visual-spatial content resource, that are applicable to different characteristics of client device 710 (e.g., display screen size, color graphics, etc.), different network quality characteristics (e.g., current bandwidth, streaming bitrate), and/or different external testing environment factors (e.g., time of day, testing location, background noise, lighting conditions, device movement or vibration, etc.), whenever such characteristics or factors are determined by the mathematical and machine-learning analyses of the server 720 to affect examinee performance levels on the visual-spatial assessment items.

Finally, in step 806, the item parameter metric (or metrics) calculated for the visual-spatial content resources in step 805 may be stored, for example, within the same assessment item data store 730 along with the associated content resource. Additionally, in some examples, the data store of visual-spatial content resources 730 may be classified and/or indexed by their item parameter metrics, to allow for quick requests and retrievals of content resources having a specified item parameter metric or range, as discussed in more detail below.

Figure 10:
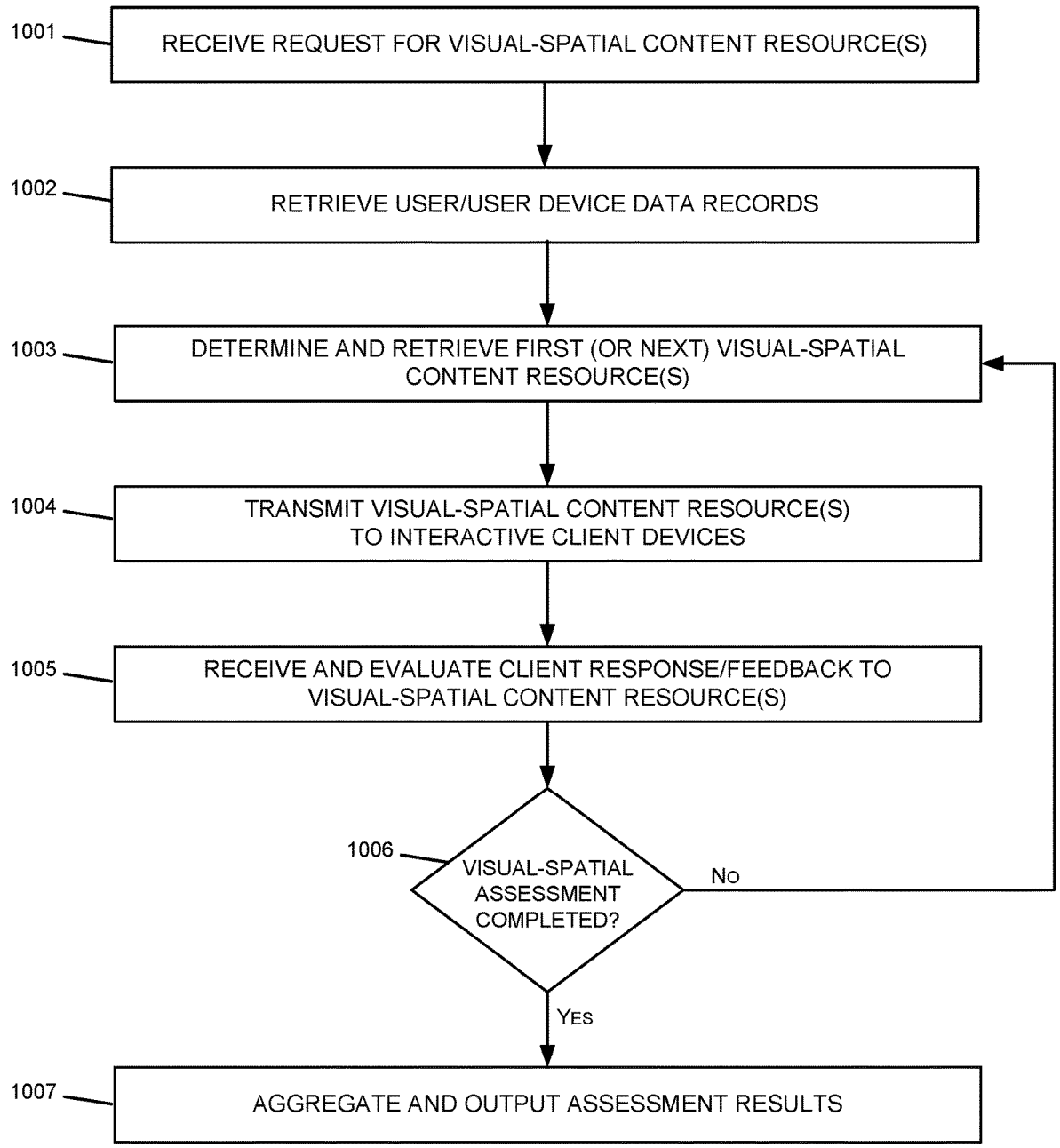
FIG. 10 is a flow diagram illustrating an example process of selecting and providing sets of diagnostic visual-spatial content resources to client devices, according to one or more embodiments of the disclosure.

Referring now to FIG. 10, a flow diagram is shown illustrating a process of selecting and providing sets of diagnostic visual-spatial content resources to client devices. As described below, the steps in this process may be performed by one or more components in the diagnostic and content analysis and selection system 700 described above. For example, each of the steps 1001-1007 may be performed by a diagnostic analyzer server 720 in communication with an content execution devices 710, visual-spatial assessment item data store(s) 730, and/or user data store(s) 725. However, in other examples, one or more of steps 1001-1007 may be performed instead by a content execution devices 710. It should also be understood that the various features and processes described herein, including generating and evaluating stores of visual-spatial assessment items for execution on client devices 740, as well as receiving and evaluating the response/feedback data associated with the execution of the diagnostic modules, need not be limited to the specific systems and hardware implementations described above in FIGS. 1-7.

In step 1001, a diagnostic analyzer server 720 may receive a request for one or more visual-spatial content resources to be presented to an user end/examinee during a perceptive reasoning assessment/evaluation. Such requests may originate from examinees and/or from content executors (e.g., clinicians, educators, therapists, etc.) who may be responsible for administering the assessment. The request may correspond to a request for a single visual-spatial content resource, or for multiple visual-spatial content resources (e.g., a diagnostic module or evaluation including a set or dynamic sequence content resources). As discussed below, in some examples, the request in step 801 may identify one or more item parameter metrics and/or ranges of item parameter metrics for the requested resources.

As described below in more detail, in some embodiments, the analysis and evaluation of an examinee performance in completing visual-spatial content resources also may take into account the user's evaluation history, clinical classification or diagnoses, demographic factors (e.g., age, etc.) and the like. In such cases, the request in step 1001 may identify the particular examinee (e.g., including an examinee name or identifier), so the diagnostic analyzer server 720 may retrieve the examinee data from the user data store 725 and/or other data sources. Additionally or alternatively, the analysis and evaluation of an examinee performance also may take into account additional factors such as the identity of the content executor, the device characteristics of the resource execution client device 710, and/or environment testing factors (e.g., background noise, time of day, location, etc.). Thus, in these cases, the request in step 1001 may include data identifying any or all of these additional assessment factors.

In some 1002, the diagnostic analyzer server 720 may retrieve user data, for example, from the user data store 725, based on the request received in step 1001. From the user data store 725 and/or other external data sources, the server 720 may retrieve data such as the history and results of any previous visual-spatial assessments taken by the examinee, the appropriate item parameter (e.g., item difficulty) level/range for the examinee's assessment, any relevant medical or clinical classifications or diagnoses previously designated to applied to the examinee by educators, clinicians, and the like, as well as any relevant demographic factors such as the age and occupation of the examinee. Each of these user data records and characteristics retrieved in step 1002 may be used by the server 720 when determining the appropriate difficulty level and/or selecting (or generating) particular custom questions for the examinee.

Further, as noted above, in additional to retrieving user data records in step 1002, in some cases the diagnostic analyzer server 720 also may retrieve relevant data records associated with the device type/device characteristics of the client device 710 on which the visual-spatial assessment is to be performed. Device features such as display screen size, graphic quality, color capabilities, and the like, also may be used by the server 720 when determining an item parameter level and/or selecting particular questions to provide to the client 710. Additionally or alternatively, the server 720 may retrieve data relating to the content executor and/or may determine environment testing factors such as current background noise level, current time of day, test location and environment, etc., which also may be used in the determination of item parameter levels and/or selection of visual-spatial assessment items.

In step 1003, the diagnostic analyzer server 720 may determine and retrieve one or more visual-spatial content resources, for example, from the assessment item data store 730, based on the request and the data determined and/or retrieved in step 1002. For example, the set of visual-spatial content resources may be selected based on a target difficulty metric determined based on the request. In some cases, the request in step 1001 may include a requested item parameter metric, while in other cases the server 720 may determine an appropriate item parameter metric range for the user based on the examinee's history of previous assessments, and the other relevant user data and additional relevant data retrieved and/or determined in step 1002.

In step 1004, the diagnostic analyzer server 720 may transmit the visual-spatial content resources determined in step 1003, to the client device 710. As discussed above, these content resources may include, for example, Wechsler Block Design test patterns and/or other types of perceptive reasoning/visual-spatial assessment items (e.g., differential ability skills (DAS) test items, image similarity tests, or matrix reasoning tests, etc.). After receiving the visual-spatial content resources, the client device 710 may execute the resources, for example, using specialized assessment software to render and display the visual-spatial and to record examinee responses and other feedback. As discussed above, the execution of content resources on the client device 710 may be managed directly by the end user/examinee, or by a specialized content executor (e.g., clinician or educator) trained and authorized to administer the perceptive reasoning/visual-spatial assessment to the examinee.

In step 1005, the examinee responses and/or any other feedback collected by the client device 710 during the execution of the content resources may be transmitted back to the diagnostic analyzer server 720. The server 720 may receive and evaluate the data, which may include assessment item performance results (e.g., the examinee's results/scores) as well as related data such as the number of failed attempts and the time to complete each assessment item. Further data received in step 1005 may include user feedback I/O data collected at the client deice 710, such as the examinee's written or verbal feedback to the assessment items, non-verbal cues indicating emotions such as such as confidence, confusion, frustration, etc. Additionally, the data received may include further device, network, and test environment data, such as network conditions, device status, and environmental testing conditions (e.g., background noise, lighting, room temperature, etc.) collected during the examinee's completion of the assessment items.

In step 1006, the diagnostic analyzer server 720 may evaluate the examinee responses and/or feedback data received in step 1005, and determine whether or not sufficient data has been collected to conclude the visual-spatial assessment of the examinee. The evaluation performed by the server 720 may include specialized processes and algorithms that use all previous assessment results of the examinee (and/or any other information received in step 1005) to determine the most accurate current aptitude/performance level of the examinee on the visual-spatial assessment, along with a statistical confidence level of the examinee's aptitude/performance level. If the statistical confidence level is greater than a minimum confidence threshold (1006:Yes), then the diagnostic analyzer server 720 may end the assessment, and then aggregate and output the examinee's assessment results in step 1007. On the other hand, if the statistical confidence level in the examinee's assessment results is less than the confidence threshold (1006:No), then the diagnostic analyzer server 720 may return the process to step 1003 to determine and retrieve one or more additional visual-spatial content resources to continue the assessment.

In some embodiments, the processing loop 1003-1006 used to control the length of the visual-spatial assessment may be performed on an item-by-item basis, while in other cases the server 720 may loop after diagnostic modules or sets of multiple assessment items. The techniques described herein embody several of the technical advantages discussed above. For example, process loop 1003-1006 provides for a dynamic length visual-spatial assessment of the examinee which is no longer than necessary in order to avoid inefficiencies and potential inaccuracies caused by distraction and mental fatigue of the examinee. Predetermining a target item parameter metric or range for the assessment may provide further efficiencies to the diagnostic process. For instance, the predetermined target difficulty metric or range based on previous examinee assessment data and/or the other performance-relevant data discussed above, may provide the process a head start in honing in on the current aptitude/performance level, without having to initially guess or randomly select target difficulty levels before finding an appropriate difficulty range for the examinee. Further, after each execution of a content resource (e.g., visual-spatial assessment item) or group of resources, the diagnostic server 720 may adjust the target difficulty metric in step 1003. Moving the difficulty metric up or down by an appropriate amount may lower the assessment process time and resources required, by avoiding executing unnecessary visual-spatial content resources that are too far above or too far the target difficulty metric, so as not to provide any useful evaluation data on the examinee.

Finally, as noted above, certain examples described herein are specific to particular types of visual-spatial assessment items (e.g., Wechsler Block Diagram tests). However, the system 100 may similarly support any types visual-spatial content and/or interactive content resources to be analyzed, selected, and executed, including visual-spatial assessment items such as differential ability skills (DAS) tests, image similarity tests, and matrix reasoning tests, etc. In additional embodiments, the techniques described herein may be applied to non-visual-spatial content resources as well, including content resources directed to assessing/testing language skills, grammatical skills, mathematical skills, geographical knowledge, scientific knowledge, and various other types of assessment items in various other fields. As an example, assessment items directed to evaluating grammatical skills may be analyzed to detect the presence of relevant grammatical features, such as specific sentence structures, sentence length, certain enumerated "difficulty features," and the like, and those features may be assigned values, detected within grammatical assessment items, and used to calculate item parameter metrics for the assessment items using similar techniques to those discussed above in FIG. 8. As another example, assessment items directed to evaluating mathematical skills may be analyzed to detect the presence of relevant math equation features, such as the equation length (in an equation to be evaluated by an examinee), the number of variables, length of digits in coefficients and constants, the numbers of types of operations, the presence of nested operations, exponents, polynomials, logarithms, parentheses and other special characters/operations, and the like, and those features may be assigned values, detected within mathematical assessment items, and used to calculate item parameter metrics for the assessment items using similar techniques to those discussed above in FIG. 8.

A limited number of embodiments of the present invention have been described, but the invention contemplates many more that are enabled by the description. For example, the concepts of the invention are applicable to performing analyses and selections of assessments as well as any other types of interactive content resources, including media resources, professional training and educational resources, interactive gaming resources, interactive eCommerce resources, etc. A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long team, short team, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An interactive diagnostic system comprising:
one or more interactive content receiver devices comprising at least one client device coupled to a network of computing devices, each of the one or more interactive content receiver devices comprising:
a first processing unit comprising a first one or more processors;
a network interface;
at least one graphical user interface (GUI), generated by a diagnostic analyzer server and transmitted through the network to be displayed on the at least one client device;
an input/output (I/O) subsystem configured to receive input data via one or more input devices connected to or integral with the interactive content receiver device; and
a first memory coupled with and readable by the first processing unit and storing therein a first set of instructions which, when executed by the first processing unit, causes the interactive content receiver device to:
establish a connection to the diagnostic analyzer server via the network interface;
receive at least one diagnostic module of interactive content from the diagnostic analyzer server via the network interface;
output, for display on the at least one GUI, the at least one diagnostic module of interactive content via the I/O subsystem;
receive input data via the I/O subsystem and at least one GUI component on the at least one GUI, corresponding to responses to the interactive content; and
transmit the responses to the interactive content to the diagnostic analyzer server via the network interface;

the diagnostic analyzer server comprising at least one computing device coupled to the network, and comprising a second processing unit comprising a second one or more processors and a second memory coupled with and readable by the second processing unit and storing therein a second set of instructions which, when executed by the second processing unit, causes the diagnostic analyzer server to:
store a first plurality of visual-spatial diagnostic content resources of a first diagnostic type, wherein the first diagnostic type corresponds to: a clinical diagnostic examination of a plurality of perceptive reasoning abilities of a first content recipient one or more of a cognitive differential ability skills (DAS) test, an image similarity test, or a matrix reasoning test or at least one of a 1×2, 2×2, or 3×3 Wechsler Block Design test;
determine a plurality of visual features within a visual content of a visual-spatial diagnostic content resource and associated with the first diagnostic type, comprising two or more of: a number of blocks, a presence of gridlines, a presence of an outline border, a rotation of the visual content, X-axis symmetry, Y-axis symmetry, a ratio of filled-in space to blank space, a number of blank halves, a number of blank parallelograms, a number of blank rectangles, a number of triangles formed from a plurality of multiple adjacent block within a plurality of blocks, and a number of squares formed from the plurality of multiple adjacent blocks within the plurality of blocks;
for each particular visual-spatial diagnostic content resource in the first plurality of visual-spatial diagnostic content resources, each including one or more arrangements of geometric figures to be presented via the at least one GUI to the first content recipient:
analyze visual content of the particular visual-spatial diagnostic content resource;
for each of the plurality of visual features associated with the first diagnostic type, determine the presence or absence of the visual feature within the visual content of the particular visual-spatial diagnostic content resource; and
use a mathematical model to calculate an item parameter metric for the particular visual-spatial diagnostic content resource, based on the determined presence or absence of each of the visual features associated with the first diagnostic type;
receive, from one or more of the interactive content receiver devices, via the at least one GUI, one or more requests for visual-spatial diagnostic content resources of the first diagnostic type, each said request including item parameter metric data;
determine one or more of the first plurality of visual-spatial diagnostic content resources having a difficulty metric corresponding to the item parameter metric data of the request; and
transmit, through the network to be displayed on the at least one GUI, data identifying the determined visual-spatial diagnostic content resources in response to the request.

2. The interactive diagnostic system of claim 1, wherein calculating an item parameter metric for a first visual-spatial diagnostic content resource comprises:
detecting a first visual-spatial diagnostic content resource includes each of a predetermined combination of the plurality of visual features; and increasing or decreasing the calculated item parameter metric for the first visual-spatial diagnostic content resource, based on the detection of each of the combination of the plurality of visual features within the first visual-spatial diagnostic content resource.

3. The interactive diagnostic system of claim 1, wherein the mathematical model used to calculate the item parameter metric for the first plurality of visual-spatial diagnostic content resource comprises a linear regression model.

4. The interactive diagnostic system of claim 1, wherein calculating the item parameter metric for the first plurality of visual-spatial diagnostic content resource comprises, for each of the particular visual-spatial diagnostic content resources in the first plurality of visual-spatial diagnostic content resources:

using multiple different mathematical models to calculate multiple different item parameter metrics for the particular visual-spatial diagnostic content resource, based on the determined presence or absence of each of the visual features associated with the first diagnostic type, wherein each of the different item parameter metrics for the particular visual-spatial diagnostic content resource correspond to different subclasses of interactive content recipients.

5. The interactive diagnostic system of claim 1, wherein the set of instructions stored by the diagnostic analyzer server, when executed by the second processing unit, further causes the diagnostic analyzer server to:

receive user profile data corresponding to the first content recipient;

select a first subset of the first plurality of visual-spatial diagnostic content resources, based on the user profile data;

transmit, to an interactive content receiver device associated with the first content recipient, the first subset of visual-spatial diagnostic content resources in sequence, wherein the sequence is dynamically determined based on a performance of the first content recipient on the previously-transmitted visual-spatial diagnostic content resources in the first subset.

6. A method of determining diagnostic modules of interactive content resources for interactive content recipients, the method comprising:

storing, by a diagnostic analyzer server comprising at least one computing device coupled to a network of computing devices and comprising at least one processor executing instructions within a memory, a first plurality of visual-spatial diagnostic content resources of a first diagnostic type, wherein the first diagnostic type corresponds to: a clinical diagnostic examination of a plurality of visual perceptive reasoning abilities of the first content recipient one or more of a cognitive differential ability skills (DAS) test, an image similarity test, or a matrix reasoning test or at least one of a 1×2, 2×2, or 3×3 Wechsler Block Design test;

determining, by the diagnostic analyzer server, a plurality of visual features within a visual content of a visual-spatial diagnostic content resource and associated with the first diagnostic type, comprising two or more of: a number of blocks, a presence of gridlines, a presence of an outline border, a rotation of the visual content, X-axis symmetry, Y-axis symmetry, a ratio of filled-in space to blank space, a number of blank halves, a number of blank parallelograms, a number of blank rectangles, a number of triangles formed from a plurality of multiple adjacent block within a plurality of blocks, and a number of squares formed from the plurality of multiple adjacent blocks within the plurality of blocks;

for each particular visual-spatial diagnostic content resource in the first plurality of visual-spatial diagnostic content resources, each including one or more arrangements of geometric figures to be presented via at least one graphical user interface (GUI), generated by the diagnostic analyzer server, to the first content recipient:

analyze visual content of the particular visual-spatial diagnostic content resource;

for each of the plurality of visual features associated with the first diagnostic type, determine the presence or absence of the visual feature within the visual content of the particular visual-spatial diagnostic content resource; and use a mathematical model to calculate an item parameter metric for the particular visual-spatial diagnostic content resource, based on the determined presence or absence of each of the visual features associated with the first diagnostic type;

receive, at the diagnostic analyzer server, via the at least one GUI, a request for one or more visual-spatial diagnostic content resources of the first diagnostic type, the request including item parameter metric data;

determining, by the diagnostic analyzer server, one or more of the first plurality of visual-spatial diagnostic content resources having a difficulty metric corresponding to the item parameter metric data of the request;

transmitting, by the diagnostic analyzer server, through the network to be displayed on the at least one GUI, data identifying the determined visual-spatial diagnostic content resources in response to the request.

7. The method of claim 6, wherein calculating a difficulty metric for a first visual-spatial diagnostic content resource comprises:

detecting a first visual-spatial diagnostic content resource includes each of a predetermined combination of the plurality of visual features; and increasing or decreasing the calculated item parameter metric for the first visual-spatial diagnostic content resource, based on the detection of each of the combination of the plurality of visual features within the first visual-spatial diagnostic content resource.

8. The method of claim 6, wherein the mathematical model used to calculate the item parameter metric for the first plurality of visual-spatial diagnostic content resource comprises a linear regression model.

9. The method of claim 6, wherein calculating the item parameter metric for the first plurality of visual-spatial diagnostic content resource comprises, for each of the particular visual-spatial diagnostic content resources in the first plurality of visual-spatial diagnostic content resources:

using multiple different mathematical models to calculate multiple different item parameter metrics for the particular visual-spatial diagnostic content resource, based on the determined presence or absence of each of the visual features associated with the first diagnostic type, wherein each of the different item parameter metrics for the particular visual-spatial diagnostic content resource correspond to different subclasses of interactive content recipients.

10. The method of claim 6, further comprising:

receiving user profile data corresponding to a first content recipient;

selecting a first subset of the first plurality of visual-spatial diagnostic content resources, based on the user profile data;

transmitting, to a client device associated with the first content recipient, the first subset of visual-spatial diagnostic content resources in sequence, wherein the sequence is dynamically determined based on a performance of the first content recipient on the previously-transmitted visual-spatial diagnostic content resources in the first subset.

* * * * *

UNITED STATES PATENT AND TRADEMARK OFFICE
CERTIFICATE OF CORRECTION

PATENT NO. : 11,210,965 B2
APPLICATION NO. : 15/982847
DATED : December 28, 2021
INVENTOR(S) : Tianshu Pan et al.

Page 1 of 1

It is certified that error appears in the above-identified patent and that said Letters Patent is hereby corrected as shown below:

In the Specification

Column 12, Line 38, "(IEFF)" should be --(IEEE)--.

Column 32, Line 53, "LIE" should be --LTE--.

Column 49, Line 10, "team, short team," should be --term, short term,--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*